United States Patent
Adams

(10) Patent No.: US 12,323,477 B2
(45) Date of Patent: Jun. 3, 2025

(54) DYNAMIC SYNCING OF CONTENT WITHIN A COMMUNICATION INTERFACE

(71) Applicant: FYI.FYI, INC, Los Angeles, CA (US)

(72) Inventor: William Adams, Los Angeles, CA (US)

(73) Assignee: FYI.FYI, INC., Los Angeles, CA (US)

( * ) Notice: Subject to any disclaimer, the term of this patent is extended or adjusted under 35 U.S.C. 154(b) by 0 days.

(21) Appl. No.: 17/984,099

(22) Filed: Nov. 9, 2022

(65) Prior Publication Data

US 2023/0156062 A1 May 18, 2023

Related U.S. Application Data

(60) Provisional application No. 63/336,593, filed on Apr. 29, 2022, provisional application No. 63/315,357, filed on Mar. 1, 2022, provisional application No. 63/278,933, filed on Nov. 12, 2021, provisional application No. 63/402,743, filed on Aug. 31, 2022.

(51) Int. Cl.
  *G06F 15/16* (2006.01)
  *H04L 65/65* (2022.01)
  *H04L 67/06* (2022.01)

(52) U.S. Cl.
  CPC .............. *H04L 65/65* (2022.05); *H04L 67/06* (2013.01)

(58) Field of Classification Search
  CPC .................................. H04L 65/65; H04L 67/06
  See application file for complete search history.

(56) References Cited

U.S. PATENT DOCUMENTS

| | | | |
|---|---|---|---|
| 2005/0004995 A1* | 1/2005 | Stochosky | H04L 67/54 709/219 |
| 2015/0195601 A1 | 7/2015 | Hahm | |
| 2015/0326620 A1 | 11/2015 | Kohnen et al. | |
| 2017/0026686 A1 | 1/2017 | Glazier et al. | |
| 2019/0096035 A1* | 3/2019 | Li | G06N 3/063 |
| 2019/0236547 A1 | 8/2019 | Huang et al. | |
| 2019/0289070 A1 | 9/2019 | Gorgenyi et al. | |
| 2020/0351536 A1 | 11/2020 | Grasset | |

OTHER PUBLICATIONS

International Search Report and Written Opinion received for PCT Patent Application No. PCT/US2022/049673, mailed on Mar. 8, 2023, 16 pages.

* cited by examiner

*Primary Examiner* — Yves Dalencourt
(74) *Attorney, Agent, or Firm* — Workman Nydegger

(57) ABSTRACT

A computer system for dynamic syncing of content within a communication interface receives an indication, from a first communication interface, to share digital content with a second user, wherein the digital content is contained with a digital file. The computer system then a copy of the digital file to the second user. The digital content within to copy of the digital file is displayed or played to the second user within a second communication interface. The computer system then receives a synchronization command from the first user. In response to the synchronization command, the computer system causes the second communication interface to mirror the first user's view of the digital content.

18 Claims, 44 Drawing Sheets

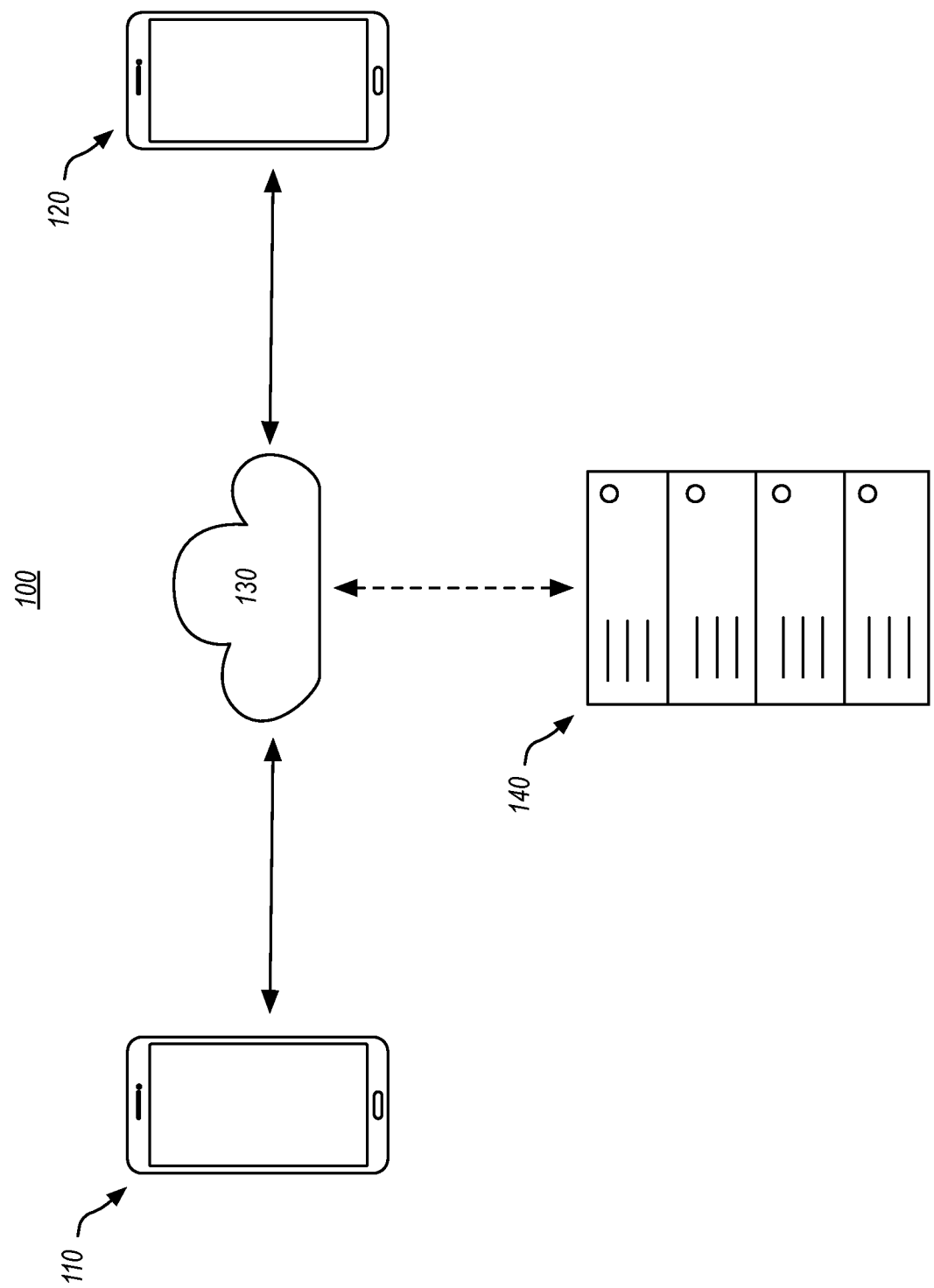

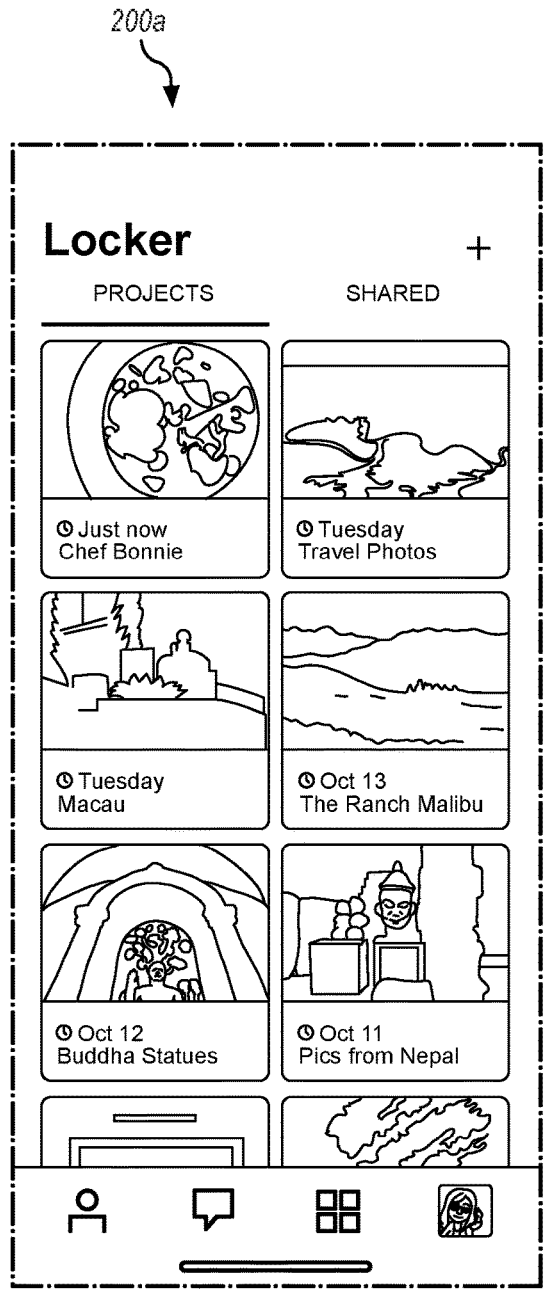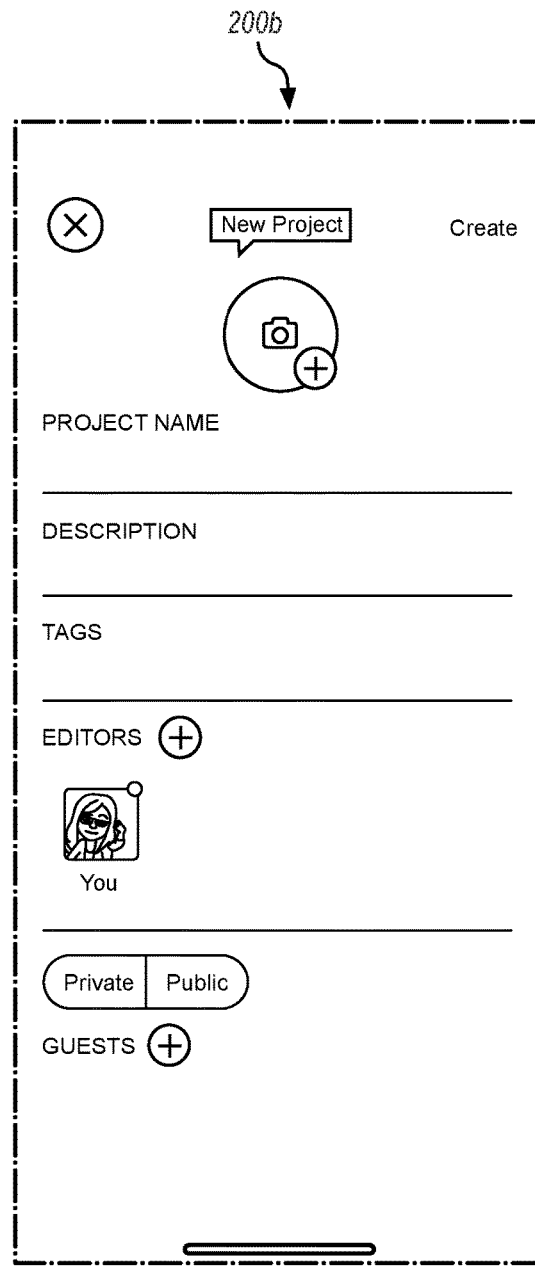
FIG. 2A                    FIG. 2B

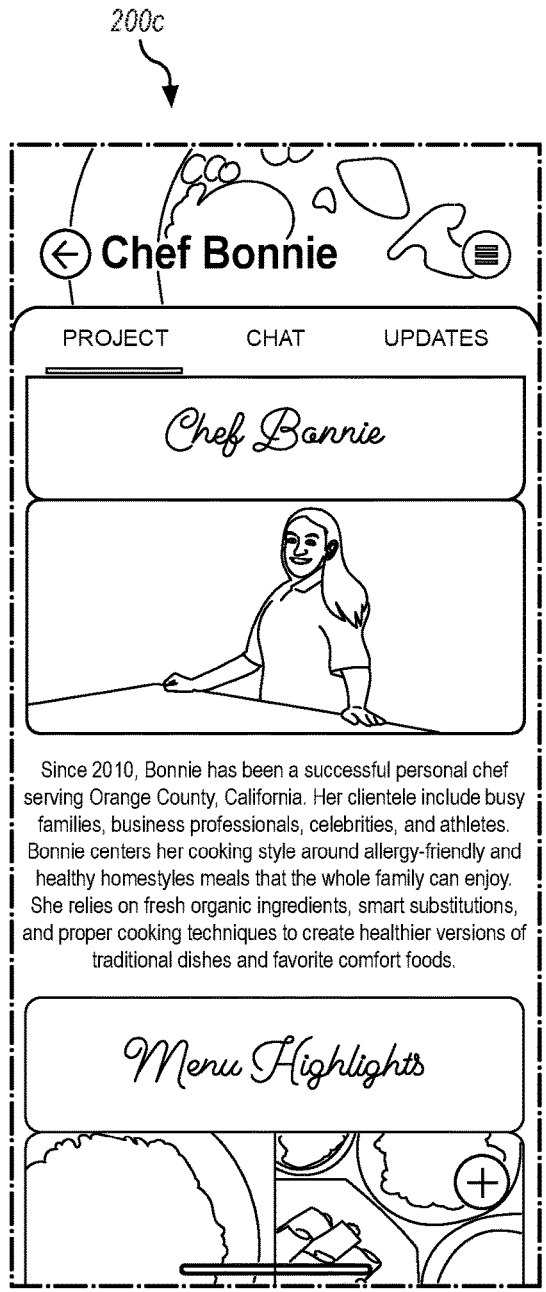
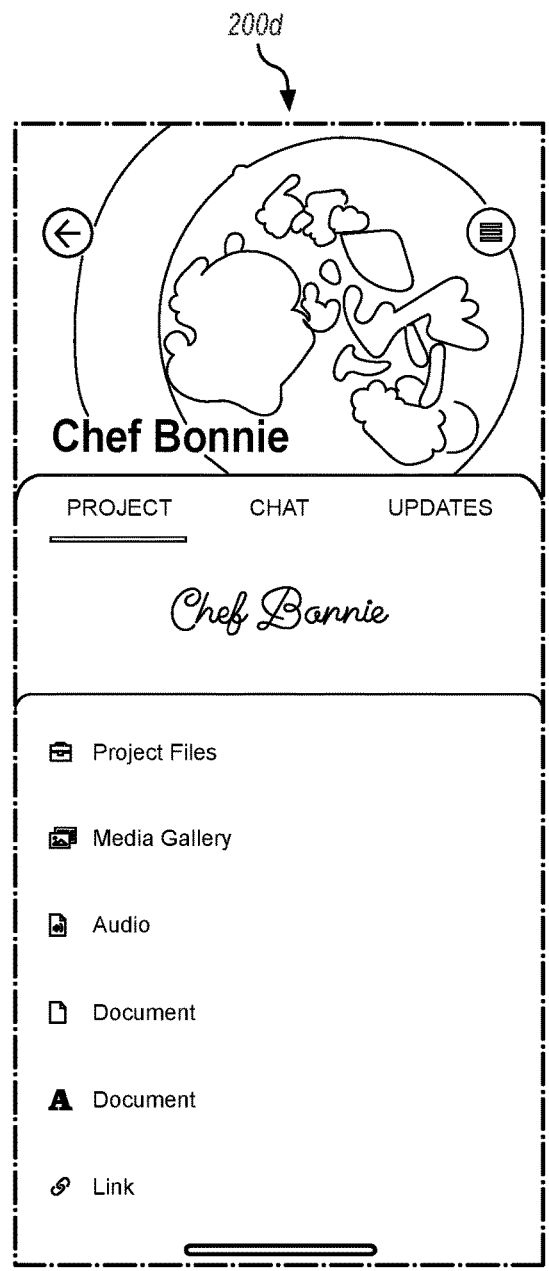
FIG. 2C
FIG. 2D

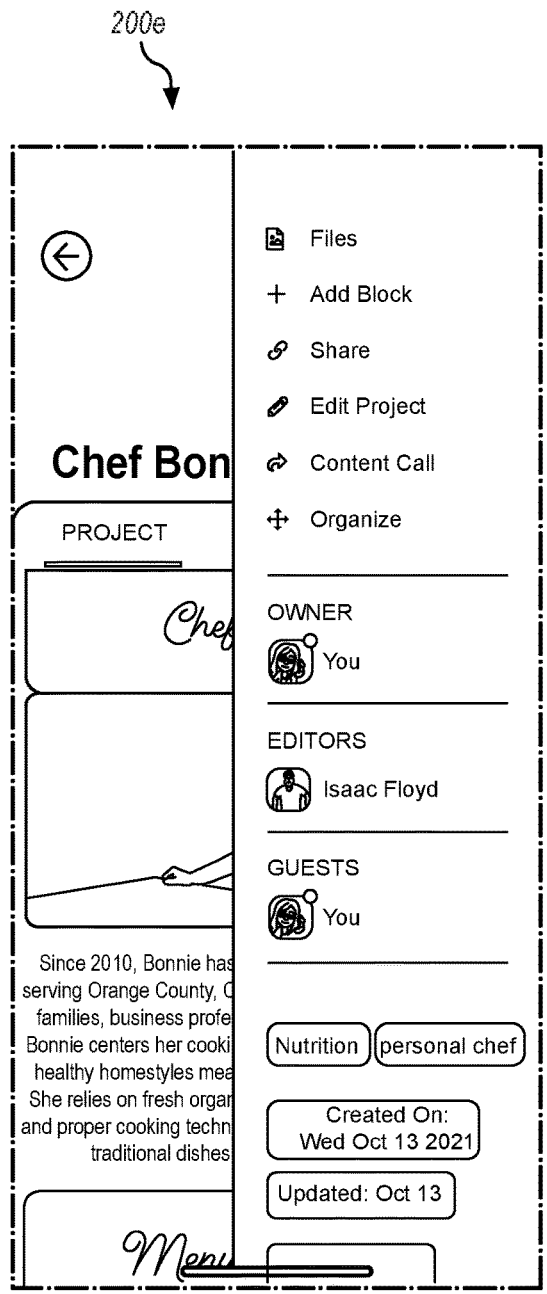
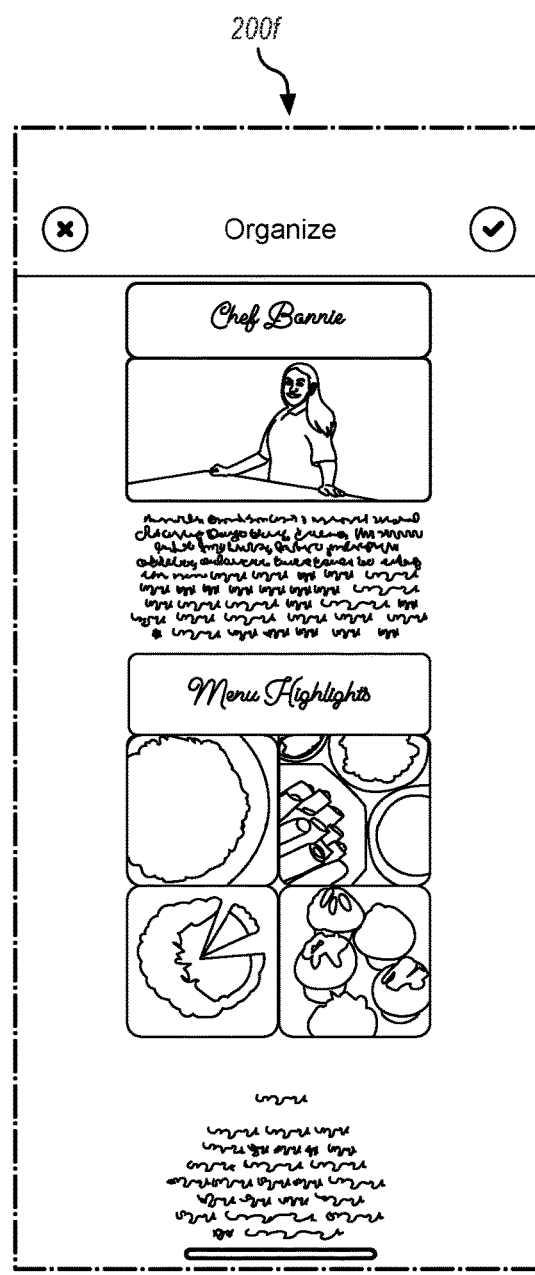
FIG. 2E
FIG. 2F

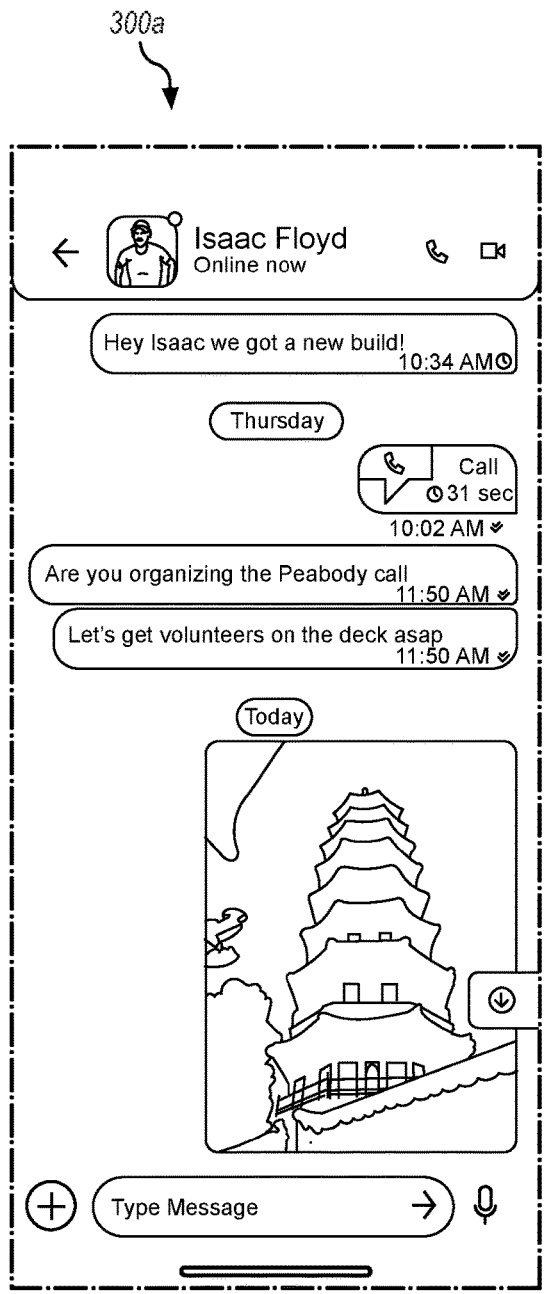
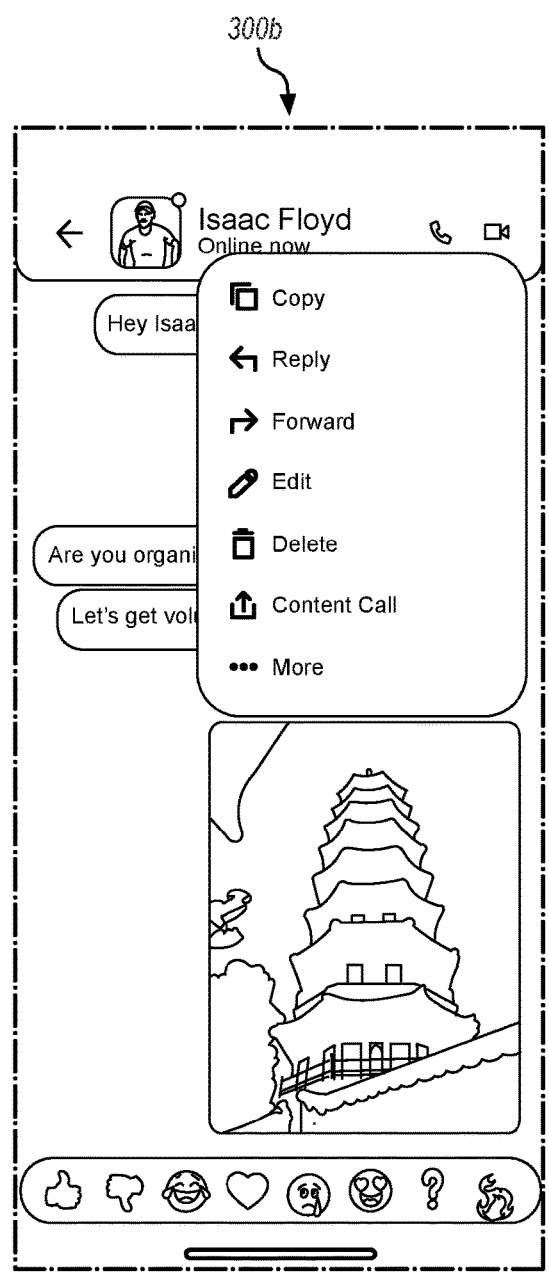
*FIG. 3A*  *FIG. 3B*

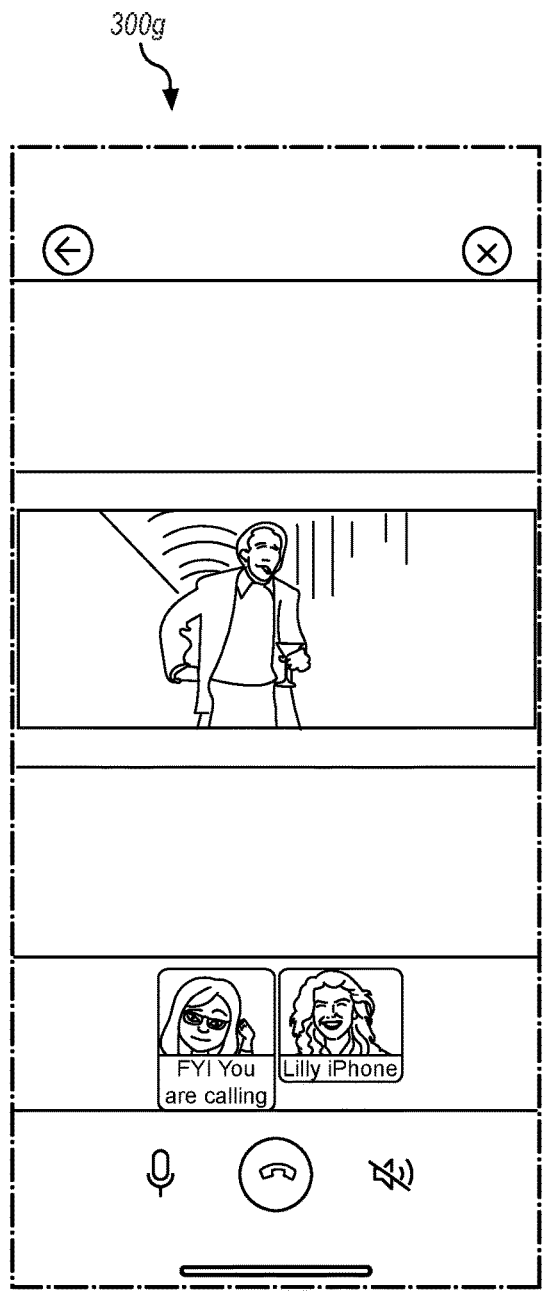
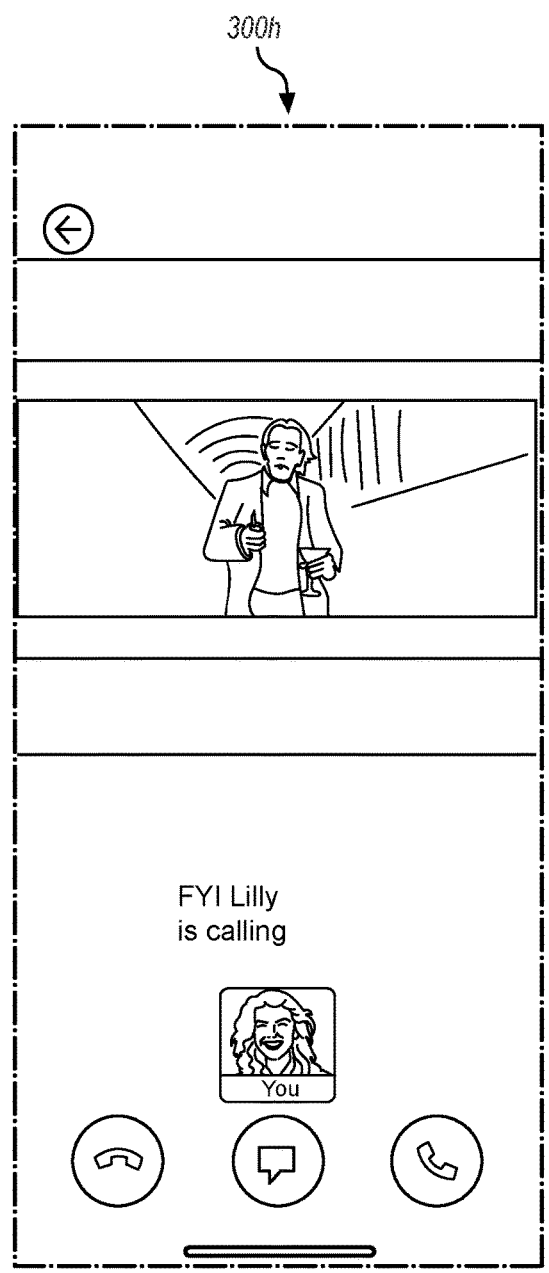
FIG. 3G
FIG. 3H

DYNAMIC SYNCING OF CONTENT WITHIN A COMMUNICATION INTERFACE

CROSS-REFERENCE TO RELATED APPLICATIONS

This application claims the benefit of and priority to (1) U.S. Provisional Patent Application Ser. No. 63/402,743 filed on Aug. 31, 2022, and entitled "DYNAMIC SYNCING OF CONTENT WITHIN A COMMUNICATION INTERFACE," (2) U.S. Provisional Patent Application Ser. No. 63/336,593 filed on Apr. 29, 2022, and entitled "DYNAMIC SYNCING OF CONTENT WITHIN A COMMUNICATION INTERFACE," (3) U.S. Provisional Patent Application Ser. No. 63/315,357 filed on Mar. 1, 2022, and entitled "DYNAMIC SYNCING OF CONTENT WITHIN A COMMUNICATION INTERFACE," and (4) U.S. Provisional Patent Application Ser. No. 63/278,933 filed on Nov. 12, 2021, and entitled "DYNAMIC SYNCING OF CONTENT WITHIN A COMMUNICATION INTERFACE." Each of the above referenced applications are expressly incorporated herein by reference in their entirety.

BACKGROUND

A tremendous amount of modern communication occurs over communication interfaces. For example, may people converse with family and friends over SMS texting, MMS texting, proprietary texting platforms (e.g., FACEBOOK MESSENGER™, APPLE MESSAGES™, etc.). Additionally, many businesses communicate over communication interfaces such as ZOOM™, MICROSOFT TEAMS™, or other similar platforms.

As an increasing amount of communication has been moved to software communication interfaces, tools and functionalities have been added to the various communication platforms in order help facilitate conversation. For example, users can send pictures, videos, audio, documents, files, and other similar content to each other over these platforms. Similarly, some platforms allow a user to share an image of their screen with other participants in order to further facilitate communication Despite these advances, there are many additional challenges to be overcome and needs to be met to further address technical limitations associated with communication over software interfaces.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for dynamic syncing of content within a communication interface. The computer system receives an indication, from a first communication interface, to share digital content with a second user, wherein the digital content is contained with a digital file. The computer system then sends a copy of the digital file to the second user. The digital content within the copy of the digital file is displayed or played to the second user within a second communication interface. The computer system then receives a synchronization command from the first user. In response to the synchronization command, the computer system causes the second communication interface to mirror the first user's view of the digital content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

FIG. 1 illustrates an embodiment of a system for dynamic syncing of content within a communication interface.

FIGS. 2A-2F illustrate user interfaces for a system for dynamic syncing of content within a communication interface.

FIGS. 3A-3J illustrate user interfaces for a system for dynamic syncing of content within a communication interface.

DETAILED DESCRIPTION

Figure 3C:
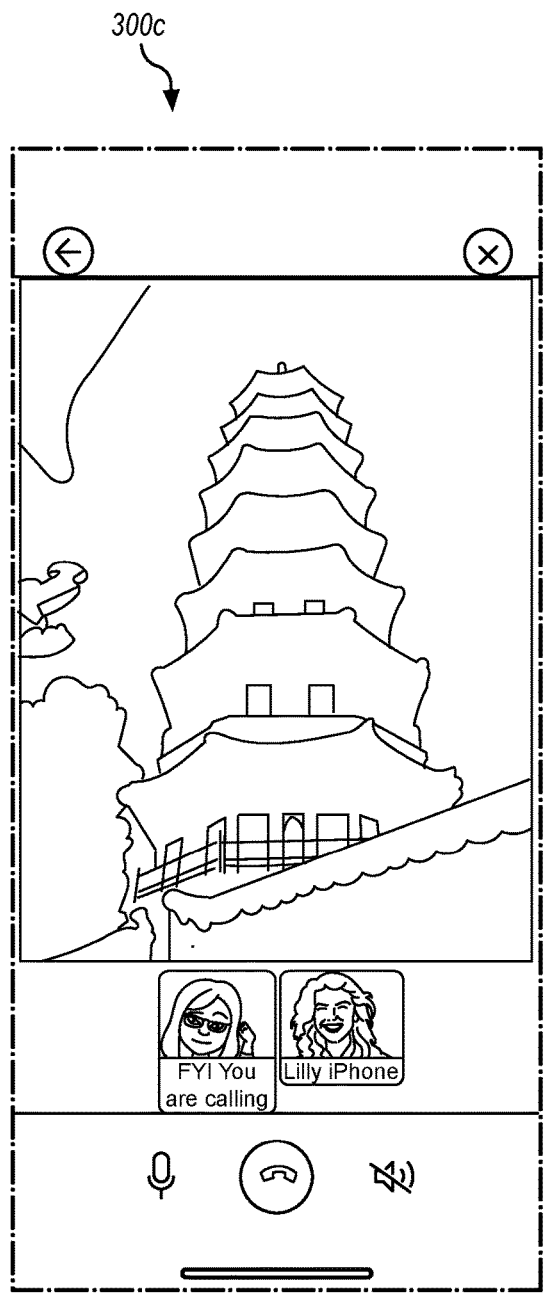
Figure 3D:
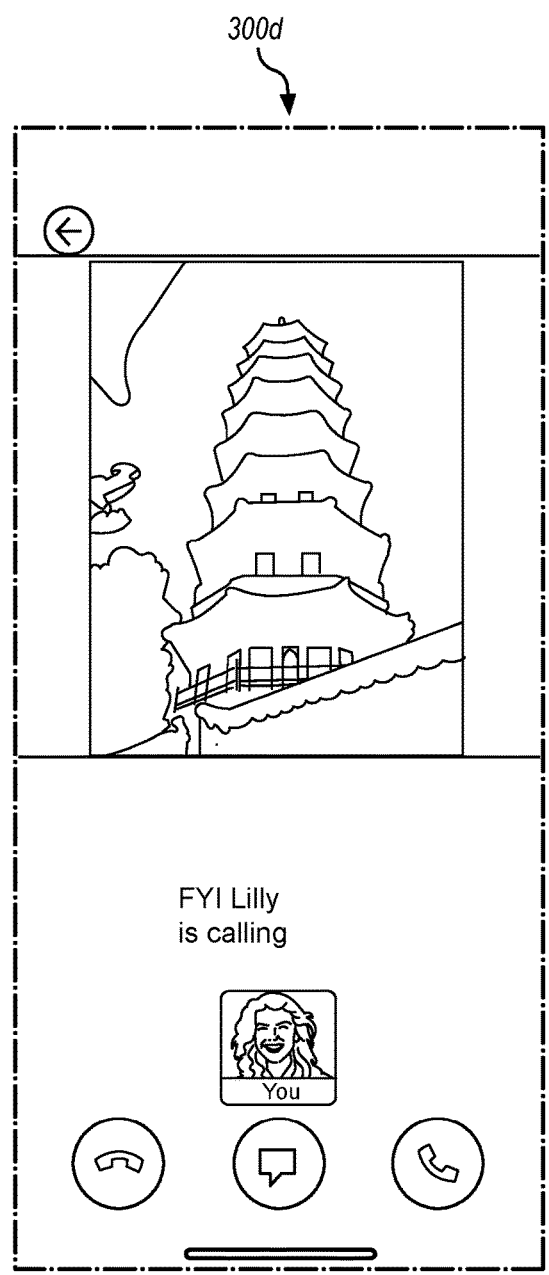

Disclosed embodiments include a computer system for the dynamic syncing of content within a communication interface. The computer system receives an indication from a first user to share digital content with a second user through a first communication interface. The computer system then transmits the digital content to the second user. The transmitted digital content is displayed to the second user within a second communication interface. The computer system causes the digital content to be visually displayed to the second user through the second communication interface. The second communication interface is configured to cause the digital content to respond to commands received from the second user. The computer system then receives a synchronization command from the first user. In response to the synchronization command, the computer system causes the second communication interface to substantially mirror the first user's view of the digital content.

In particular, in at least one embodiment, a first user is able to share digital content, such as videos, audio files, PDFs, or documents with a second user. One will appreciate, however, that digital content may include any digital file of any type that is shareable over a communication interface. Once shared, the digital content is transmitted to the second user's viewing device. The second user is able to independently interact with the digital content. For example, the second user can scroll, zoom, scrub, or otherwise interact with the digital completely free of the first user.

In at least one embodiment, however, the first user is able to activate a synchronization ("sync") function (also referred to herein as "sync mode") that causes the second user's view to substantially mirror the first user's view. As used here, "substantially mirror" refers to the two views showing substantially the same material but allowing for differences due to screen resolution, screen size, device interface, etc. As such, whether stated explicitly or not, all uses of "mirroring" described herein should be interpreted to include "substantial mirroring" as described above. Additionally, the second user may lose the ability to independently interact with the digital content. Instead, the second user's view may continue to substantially mirror the first user's view until the first user deactivates the sync function. In contrast, in at least one embodiment, the second user is able to activate the sync function such that the first user loses the ability to independently interact with the digital content but is instead shown a substantial mirror of the second user's view.

In at least one embodiment, the sync function is implemented by tracking both the second user's and the first user's interactions within the digital content. For example, the system may track the scroll or zoom offset as the first user interacts with the digital content. The scroll or zoom offset may be tracked on a per-pixel basis. For example, as the first user scrolls through a digital document, the first user's viewing device may track the scroll offset as the number of pixels that the user has scrolled. This scroll offset can then be converted into a standard, normalized offset that is not dependent on the pixel density of the second's viewing device. For example, the scroll offset may be converted to an offset based upon a predetermined page length of a document. For instance, the first user may have a scroll offset in the form of a percentage (e.g., 65%) indicating what percentage of the total document they have scrolled and are currently viewing.

In at least one embodiment, the first user's device can communicate the first user's scroll offset or converted scroll offset to the second user's device. The second user's device can then compare the second user's scroll offset to the first user's scroll offset and identify the offset between the first user's view and the second user's view. For example, the second user may have a scroll offset of 40% meaning that the second user is currently viewing the document at the 40% scroll offset. In response, the second user's device can mirror the first user's view. For example, the second user's view may be incremented by a 25% scroll offset (e.g., 65%-40%). As the first user continues to scroll or otherwise interact with the digital content, the first user's device continues to send updated scroll offsets to the second user's device causing the second user's device to continue to mirror the first user's view. As such, in at least one embodiment, prior to receiving the synchronization command from the first user, the second user is allowed to interact with the digital content without constraint from the first user. However, after receiving the synchronization command from the first user, the second user may be constrained to only view and interact with a mirror of the first user's view.

One of skill in the art will appreciate that communicating only scroll offsets between the first user and the second user utilizes significantly less bandwidth than communicating actual image data from the first user's view. As such, one embodiment of described present system utilizes significantly less bandwidth than conventional methods that rely on the communication of actual image data in order to mirror a screen.

Additionally, the present invention is not limited to only tracking scroll offsets. For example, when video or audio content is shared, the system may track the time stamp or scrub position associated with the first user's view of a video or sound of a track. In such a case, the first user's viewing/listening device need to only communicate the track position (or scrub position) of the first user's view to the second user's viewing/listening device. Similar syncing functions can be applied to a variety of different digital content.

FIG. 1 illustrates an embodiment of a system 100 for dynamic syncing of content within a communication interface. For example, a first user's device 110 may comprise a mobile phone. The first user may desire to share digital content with a second user's device 120 through a network connection 130. The first user may access a communication interface, such as a chat application, on the first user's device 110. The communication interface provides a sharing feature that allows the first user to share the digital content with the second user's device 120 over the network connection 130. The sharing feature may comprise a user interface buttons or menu option.

In at least one embodiment, when the first user shares digital content that is stored on the first user's device 110 with the second user's device 120, a copy of the digital content to transmitted over the network connection 130 to the second user's device 120. The second user's device 120 then stores the digital content locally and allows the second user to independently interact with the digital content.

The first user may then activate a sync function within the communication interface on the first user's device 110. Activating the sync function may comprise touching a "sync" user interface button. After the sync function is activated, the first user's devices 110 communicates to the second user's device 120 mapping data related to the digital content that is being displayed on the first user's device 110. As used herein "mapping data" refers to a spatial location or temporal location within the digital content that mirrors the digital content as presented on the first user's device. For example, the mapping data may comprise a spatial location such as a pixel offset, zoom level, or some other related spatial aspect of the digital content. Similarly, the mapping data may comprise a temporal location such as a time stamp in a video or audio file.

Additionally, in at least one embodiment the mapping data comprises multiple layers of spatial location or temporal location data. For example, the first user may be viewing a project page (described below) that contains multiple video or audio files. The first user may be viewing a particular view that includes both text content and multiple different video or audio files. In response to activating the sync function, the first device may communicate to one or more participating devices mapping data in the form of a scroll offset for the project page and a video file identifier and scrub position for a particular video that the first user is playing from the project page. Accordingly, in at least one embodiment, the mapping data comprises mapping data for multiple different digital assets (e.g., the project page and the video file) that are independent of each other in that the video file and the project may both be executed and utilized independent of each other.

The first user's devices 110 communicates the mapping data to the second user's device 120, which causes the digital content on the second user's device to mirror the digital content on the first user's device. One will appreciate that in at least one embodiment, the first user's devices 110 need only communicate the mapping data to the second user's device 120 in order to cause the second user's device 120 to mirror the first user's devices 110. In contrast, convention methods may require the utilization of significantly more bandwidth to communicate image data, video data, and/or audio data to mirror the digital content between the two devices.

In at least one embodiment, the first user is able to limit the ability of the second user to interact with the digital content. For example, the first user may desire to send sensitive or important digital content to the second user. For instance, the first user may be creating a song that they wish the discuss with the second user, but the first user may wish to ensure that after the conversation the second user no longer has access to the digital content. In at least one embodiment, the first user's device 110 can share the digital content to the second user's device 120 in such a way that the second user can only interact with the content during communication with the first user and after the communication, the digital content is deleted.

For example, the first user's device 110 may be able to send the digital content to the second user's device 120 such that the digital content is only placed within volatile memory on the second user's device 120. Additionally, the digital content may be placed within a software container on the second user's device 120 such that the digital content cannot be copied or otherwise accessed by other software on the second user's device 120. The software container may further be encrypted using a private encryption key stored on the first user's device 110. When the first user's device 110 transmits the digital content to the second user's device 120, the second user's device may communicate a handshake to the first user's device 110. In response to the handshake, the first user's device 110 may communicate a perishable decryption key to the second user's device 120 that can be used to decrypt the software container. The perishable decryption key may be configured to perish once the communication is ended or at a specific time frame. Once the perishable decryption key expires the second user's device 120 may request a new perishable decryption key from the first user's device 110. The first user is then given a choice as to whether to allow the second user continued access to the digital content.

In contrast, in at least one embodiment, the digital content is not communicated directly to the second user's device 120. Instead, the digital content is communicated to a server 140 for storage. The second user's device 120 displays to the second user the digital content as presented by the server 140. When the first user activates the sync function, the first user's device communicates mapping data to the server 140. The server 140 may be configured with greater bandwidth availability, memory, and processing power such that the server 140 is able to communicate age data, video data, and/or audio data of the digital content to the second user's device much faster and more efficiently than the first user's device 110 would be able to. As such, in this embodiment, the first user's device 110 communicates mapping data to the server 140, and the server 140 communicates image, video, or audio data to the second user's device 120 such that the second user's device 120 mirrors the first user's device 110.

FIGS. 2A-2F illustrate user interfaces 200(a-f) for a system for dynamic syncing of content within a communication interface. Interface 200a depicts a "locker" that stores various projects. As used herein, the "locker" comprises a user interface that presents to the user various projects that are stored on the user's device. A "project" is a space where the user can store collections of multimedia content. It can be used in a variety of ways. A project can be a moodboard, a photo album, a web magazine, a to-do list, a playlist, a product lookbook, etc. The user can also use it like a cloud storage drive, such as Dropbox™ or Google Drive™.

In FIG. 2B, interface 200b depicts an interface for creating a new project. For example, when a user creates a new project, she can add a banner image, title, description, and tags to the project. The user can also add other users as editors who will have access to modify a project. Additionally, the user can also add guests who can only view a project. Similarly, the user can set a project to be private or public.

In FIG. 2C, interface 200c depicts an example of a project screen. In this example, a personal chef has created a page showing her menu and offerings. She can share this with clients over text message or calls. The chef can tap on the plus sign (+) to add new assets to a project.

In FIG. 2D, interface 200d depicts examples of the types of assets that a user can add to a project. The Media Gallery function opens the photo gallery on the user's phone where she can select photos or videos. Similarly, the Audio function opens an audio library stored on the user's phone, and the Document function opens a Documents library stored on the user's phone where the user can add PDFs, Word docs, PPT, MP3s etc. The user can also add blocks of text and links.

In FIG. 2E, interface 200e depicts a menu to access a project's settings. The user can view the file history, edit a project, or launch a call around the project. The user can also view the administrator, editors, and guests.

In FIG. 2F, interface 200f depicts a screen where the user can reorganize the assets in her project. For example, the user can change the order of project blocks by dragging them to the position she wants.

FIGS. 3A-3J illustrate user interfaces for a system for dynamic syncing of content within a communication interface. In particular, FIGS. 3A-3J illustrate interfaces 300a-300j that depict various embodiments of a call preview feature. The call preview feature allows a user to give someone else a preview of what the user wants to talk about on a call, in the incoming call screen. As will be explained further below, the user can select any multimedia content for a call topic preview, such as a photo, video, document, or webpage.

In FIG. 3A, interfaces 300a and 300b depict that a user can launch a call from any asset within the disclosed system and show the asset as a call topic preview. For example, in interfaces 300a and 300b a user can long press on an image shared in a chat. The user can then select "Content Call." In FIG. 3C, interface 300c depicts an embodiment of an outgoing call screen in response to the user selecting "content call" in interface 300b. In contrast, interface 300d depicts an embodiment of the incoming call screen looks for the receiver of the call. As depicted the receiver is able to see the shared asset before he answers the call.

Figure 3E:
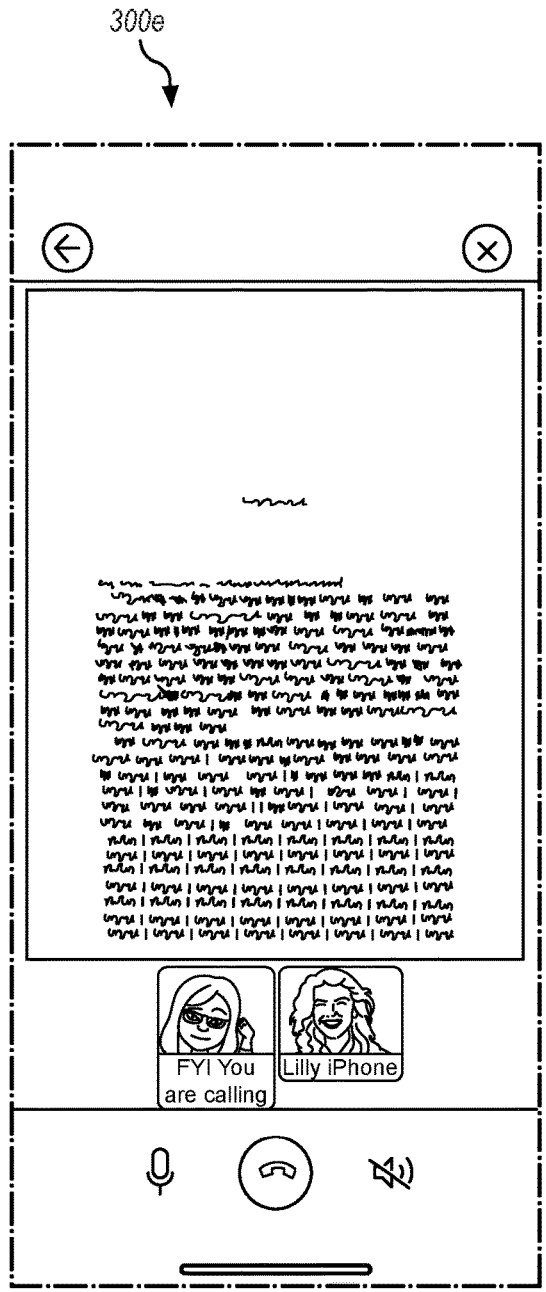
Figure 3F:
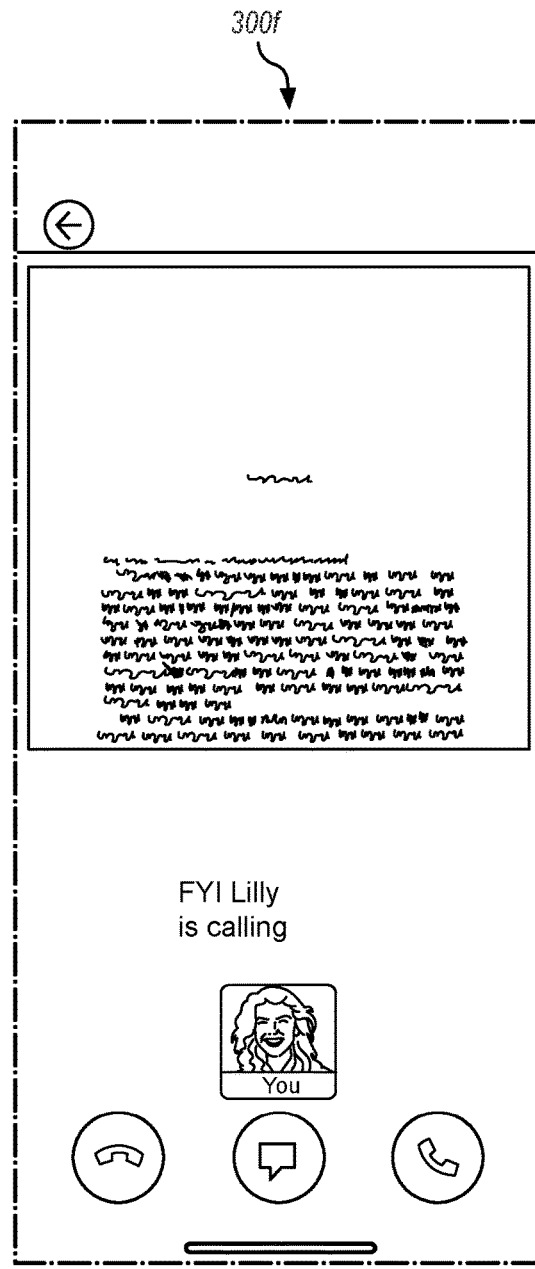
Figure 3I:
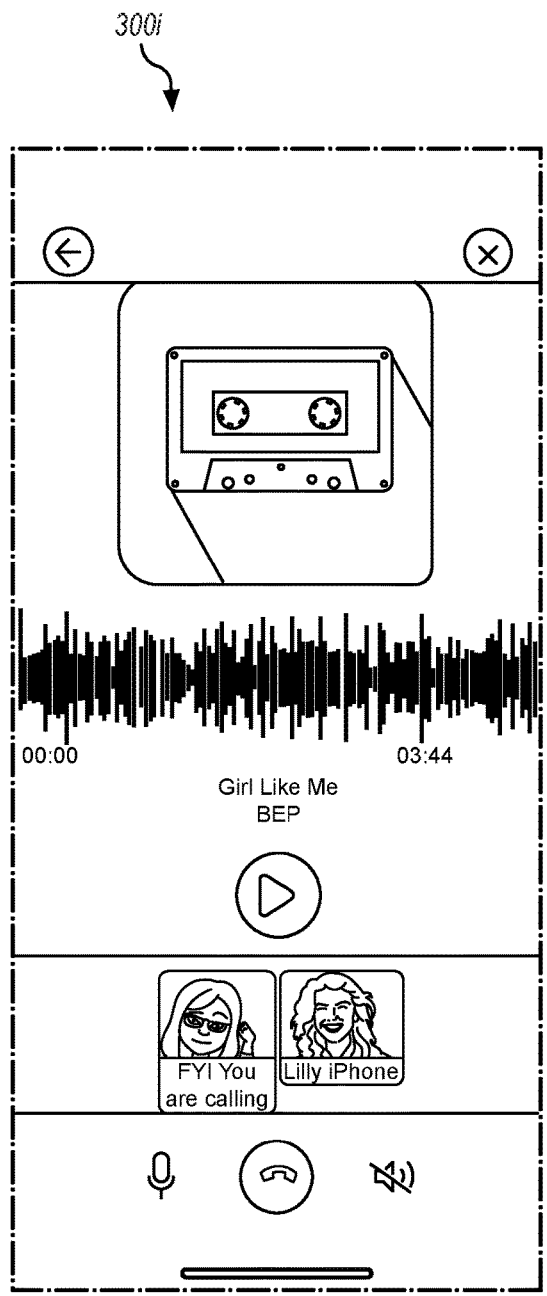
Figure 3J:
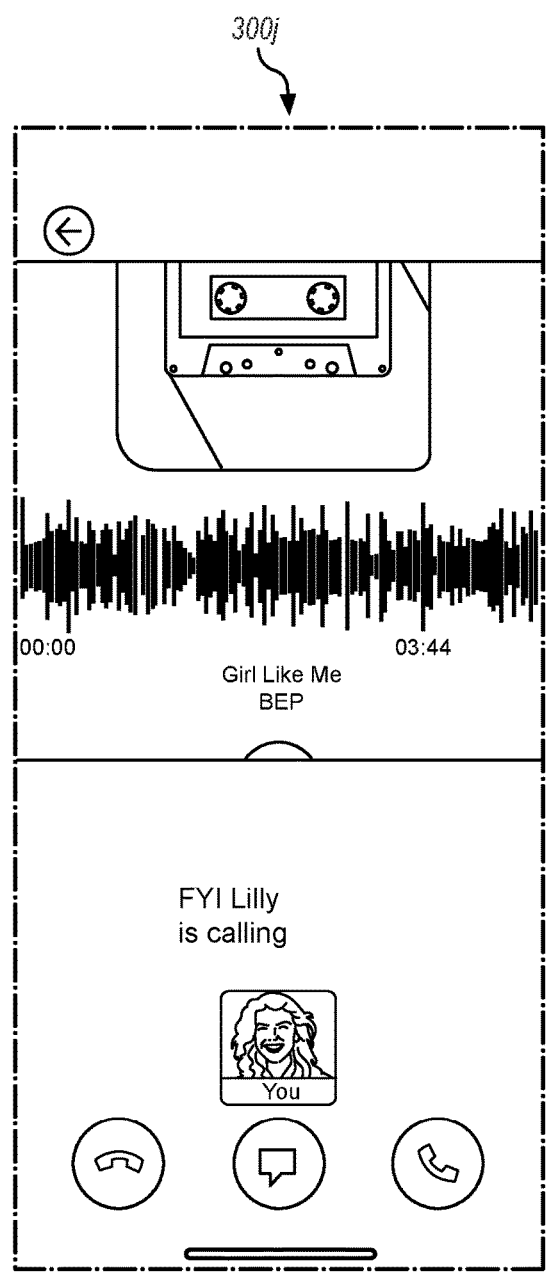

In FIGS. 3E and 3F, interfaces 300e and 300f depict the sharing of a PDF or Word document asset. The outgoing interface 300e and the incoming interface 300f display the respective call screens. In at least one embodiment, the receiver is able to freely and completely interact with the digital content prior to answering the call. For example, the receiver may be able to scroll through and read and entire PDF or Word document asset prior to answering the call. Similarly, the receiver may be able to play an entire audio file or video file prior to answering the call. Once the receiver answers the call, the system will display the entire document to the receiver. In FIGS. 3G and 3H, interfaces 300g and 300h depict a video file being shared within a call. The outgoing interface 300g and the incoming interface 300h display the respective call screens. If the receiver answers, he will see the full video file and be able to play the video. In FIGS. 3I and 3J, interfaces 300i and 300j depict an audio file being shared within a call. The outgoing interface 300i and the incoming interface 300j display the respective call screens for an audio file (MP3, WAV etc.). If the receiver answers, he will be able to play the audio file and listen.

In at least one embodiment, the disclosed system has a unique way of handling content sharing, presenting, and syncing on phone calls. The below figures depict how various types of media are shared on a call. These features apply to both audio and video calls and are not limited to the number of participants. It may work for any call with two or more participants. It may also work for any device or platform that contains a screen or other mechanism for experiencing audio/visual content.

Figure 4A:
FIGS. 4A-4B illustrate user interfaces for a system for dynamic syncing of content within a communication interface.
Figure 4B:
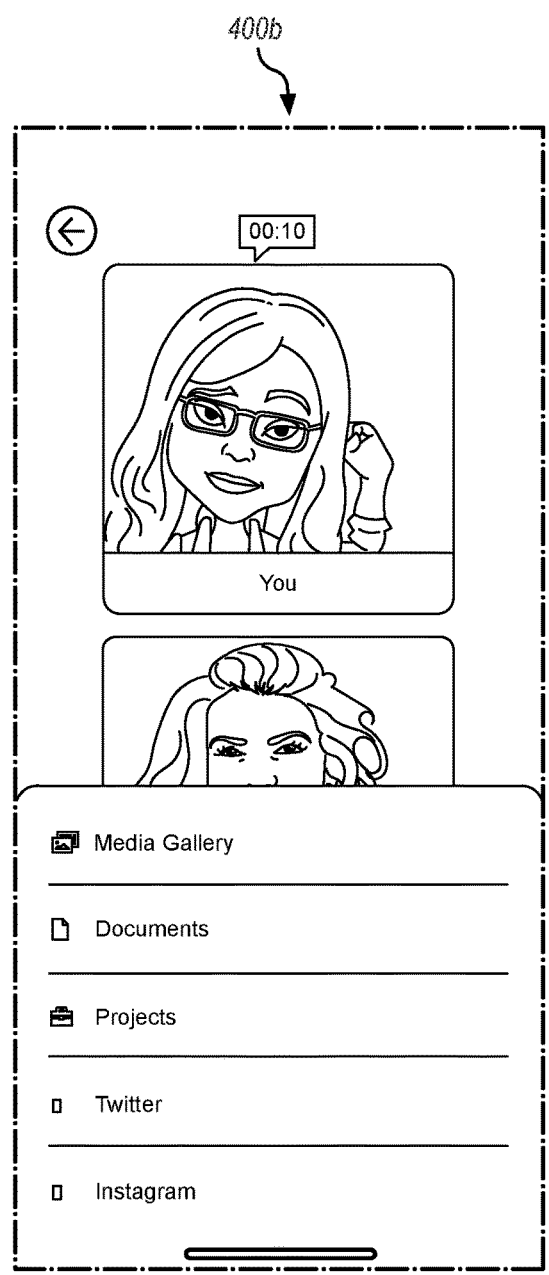

FIGS. 4A-4B illustrate user interfaces for a system for dynamic syncing of content within a communication interface. FIG. 4A depicts an interface 400a that is the UI for a call. A user can share content by pressing the "Share+" button on the lower right corner of the screen. FIG. 4B depicts an interface 400b that illustrates when the user selects "Share+", the system will display a menu that shows the types of content that can be shared. The depicted types of content for sharing are merely exemplary and may include any number of different digital assets.

Figure 5A:
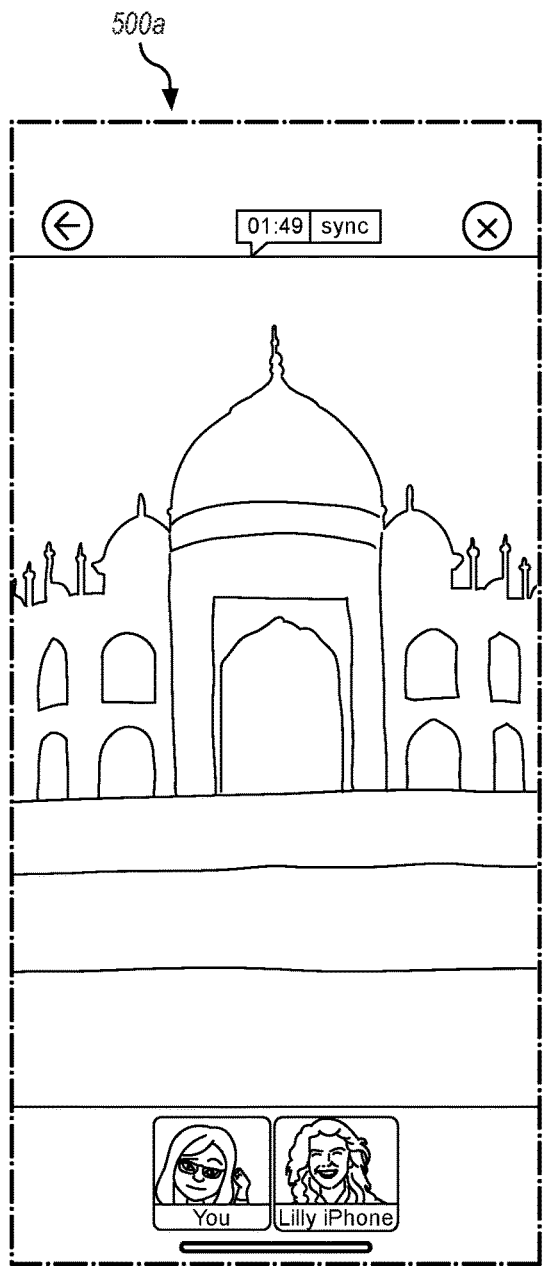
FIGS. 5A-5D illustrate user interfaces for a system for dynamic syncing of content within a communication interface.
Figure 5B:
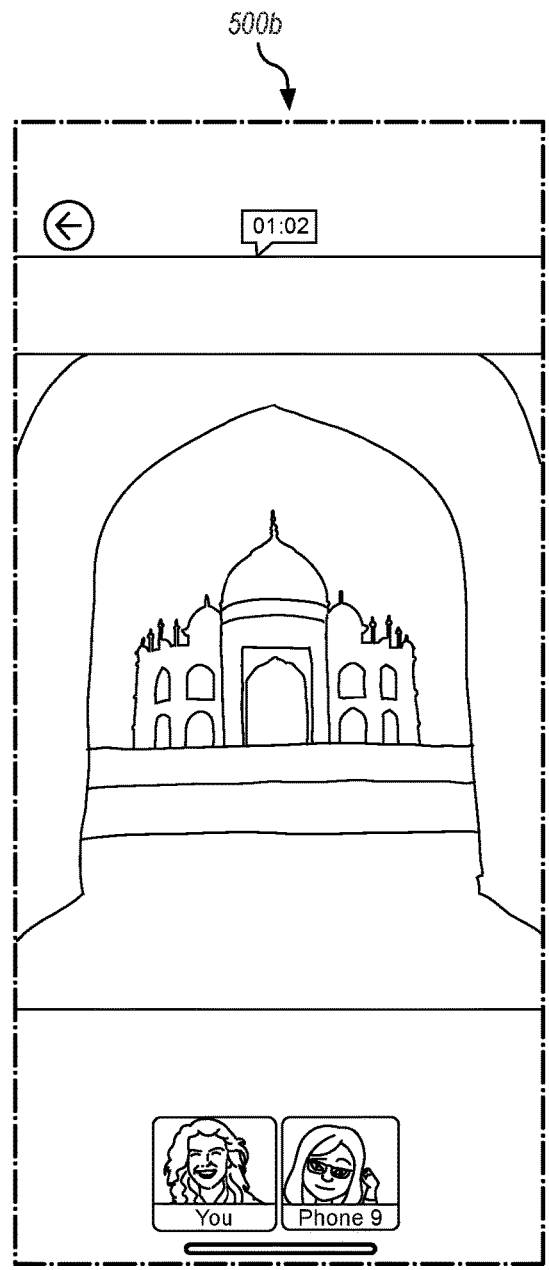

FIGS. 5A-5D illustrate what it looks like when a caller shares a photo with other participants in synced and unsynced states. FIGS. 5A and 5B illustrate an embodiment when the sync function is turned off. Specifically, interface 500a depicts a presenter's view with the sync function turned off. Interface 500b depicts the viewer's screen without the sync button. In at least one embodiment, only the presenter is able to activate the sync function. In contrast, in at least one embodiment, any participant on a call is able to activate the sync function. When sync function is off, all participants can zoom or scroll on the photo to view it however they please.

Figure 5C:
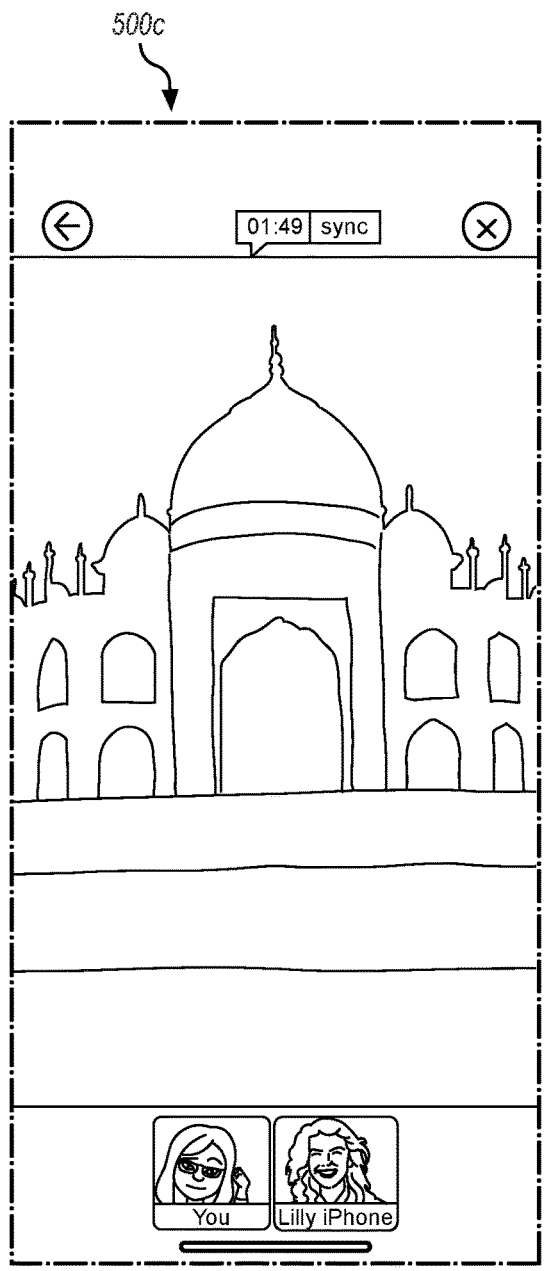
Figure 5D:
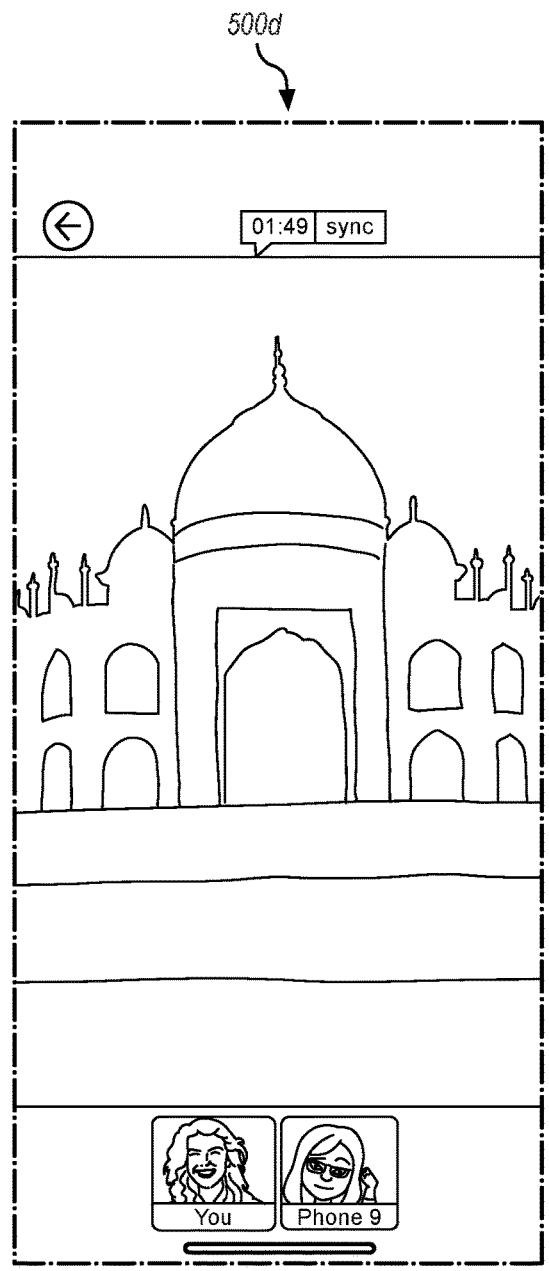

FIGS. 5C and 5D illustrate when sync mode is turned on. As depicted, both interface 500c, 500d now show the status of sync mode turned on. If the presenter zooms in on the photo as shown, the other participants will see the same view in real time. Note the time stamp on the call is the same on both screens to show that this is simultaneous.

Figure 6A:
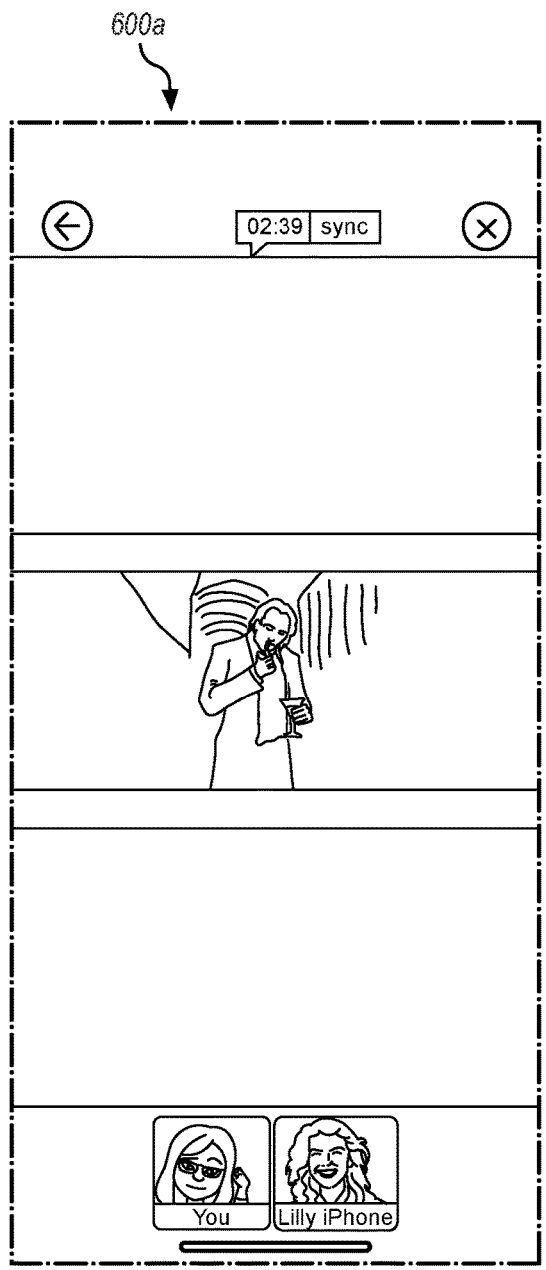
FIGS. 6A-6D illustrate user interfaces for a system for dynamic syncing of content within a communication interface.
Figure 6B:
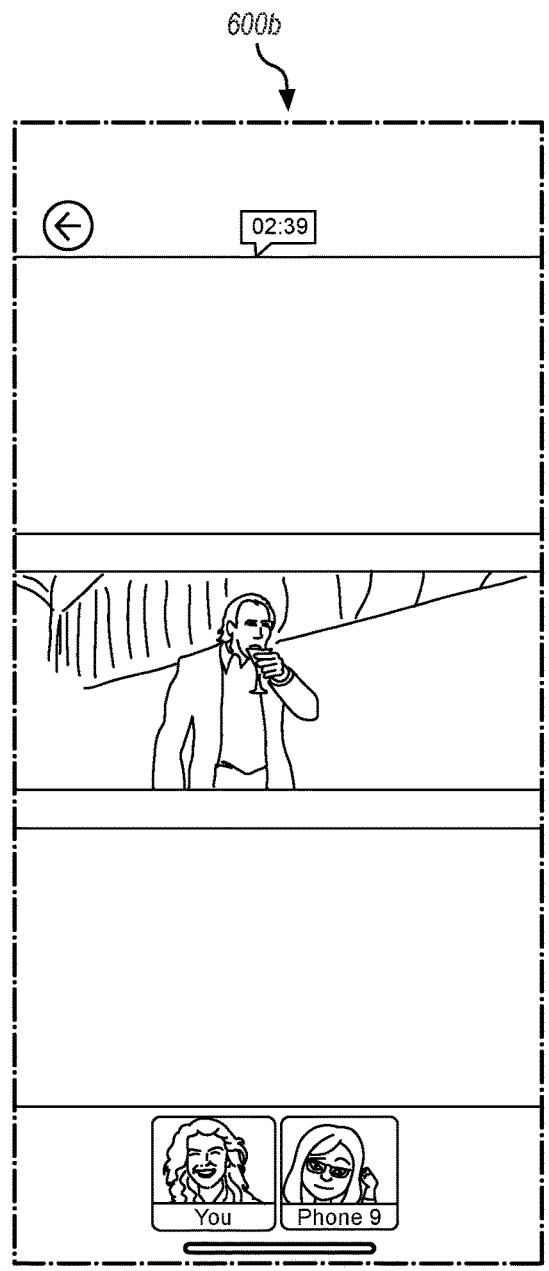
Figure 6C:
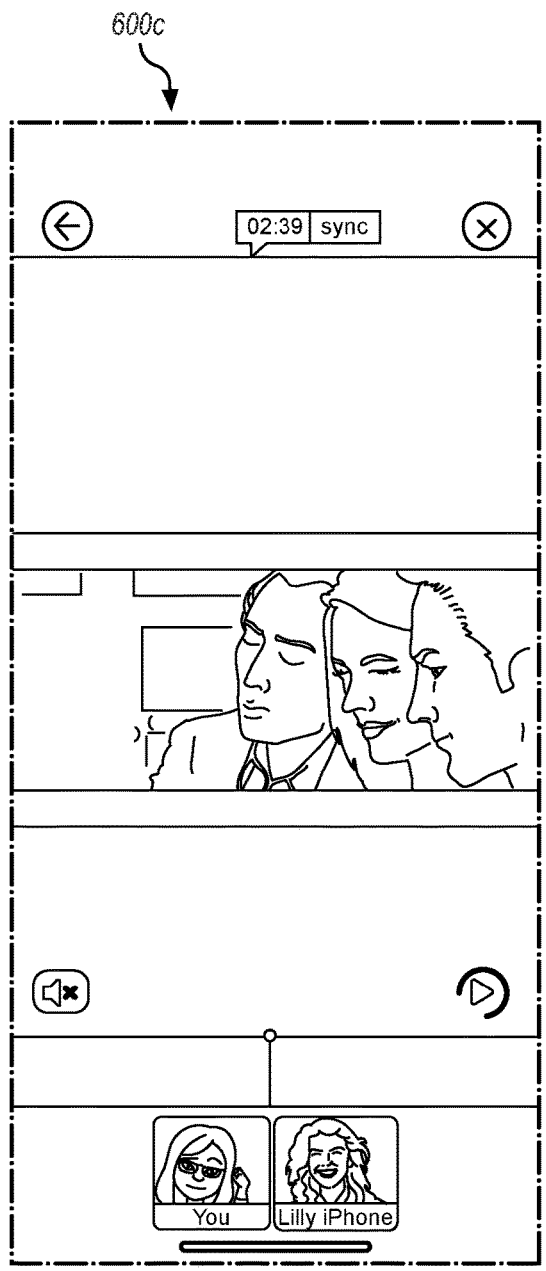
Figure 6D:
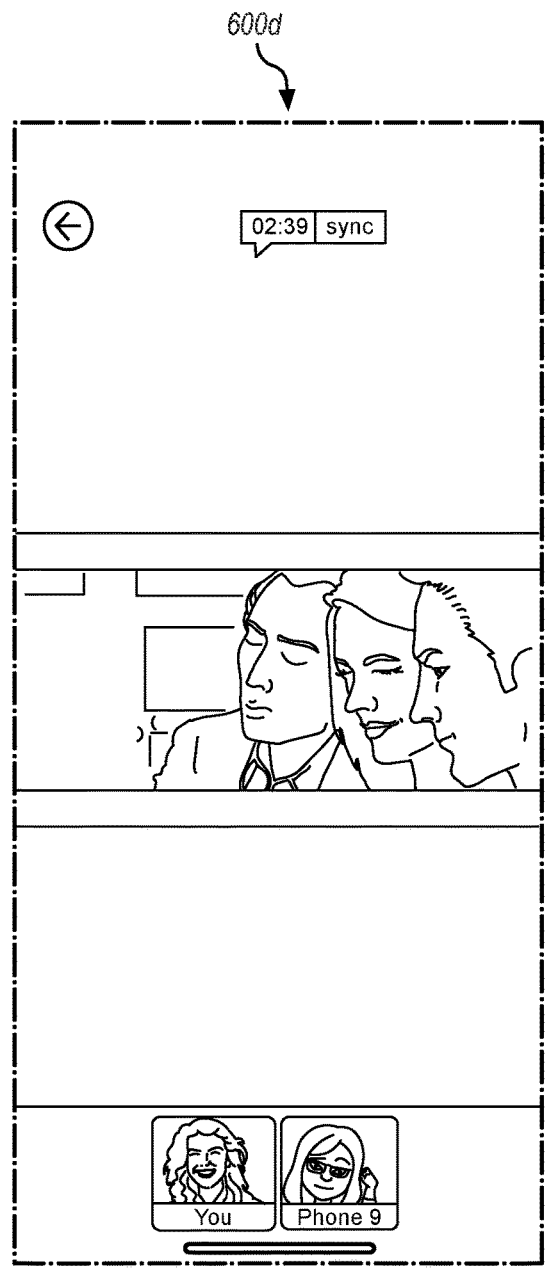

FIGS. 6A-6D illustrate what it looks like when a caller shares a video with other participants in synced and unsynced states. In particular, FIGS. 6A and 6B illustrate when sync mode is turned off. Interface 600a is the presenter's view that includes a button at the top of her screen to control the sync function. Interface 600b is the viewer's screen, which does not have the sync button. When the sync function is off, all participants can view and control playback of the video on their own screen, including scrubbing, pausing, turning sound on/off, control volume etc. Here, they are viewing different frames of the video at the same point in time (note the timestamp of the call). FIGS. 6C and 6D illustrate when sync mode is turned on for a video. All participants will snap to the same frame and hear the same audio as the presenter as she controls the playback of the video. Only the presenter's interface 600c has the ability to scrub on the video's timeline, and to turn sound on/off. Note the time stamp on the call is the same on both interface 600c, 600d to show that this is simultaneous.

Figure 7A:
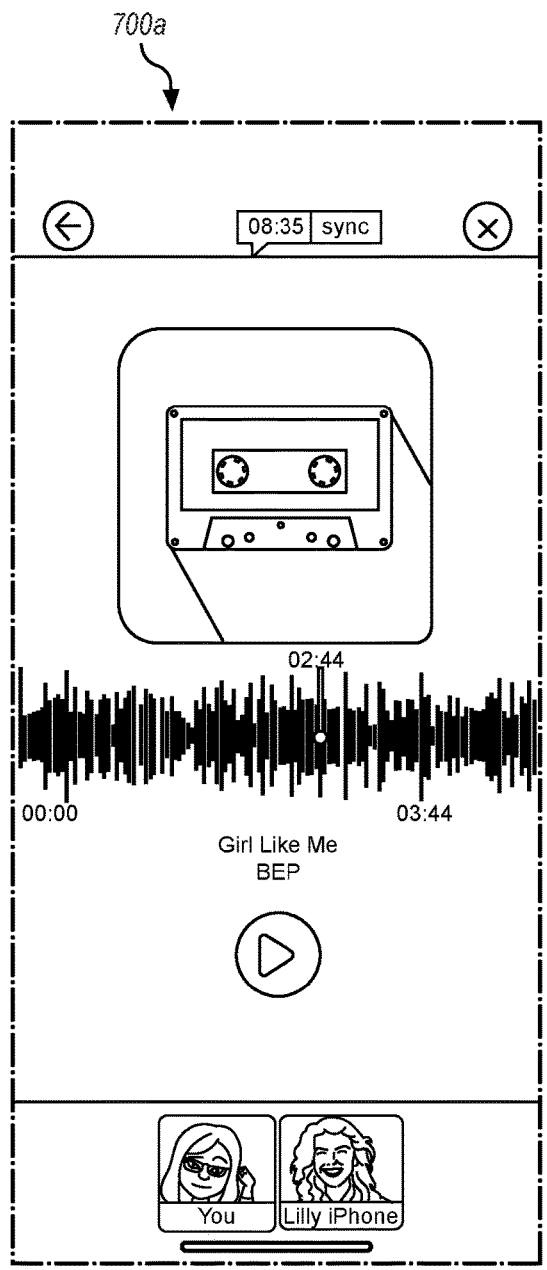
FIGS. 7A-7D illustrate user interfaces for a system for dynamic syncing of content within a communication interface.
Figure 7B:
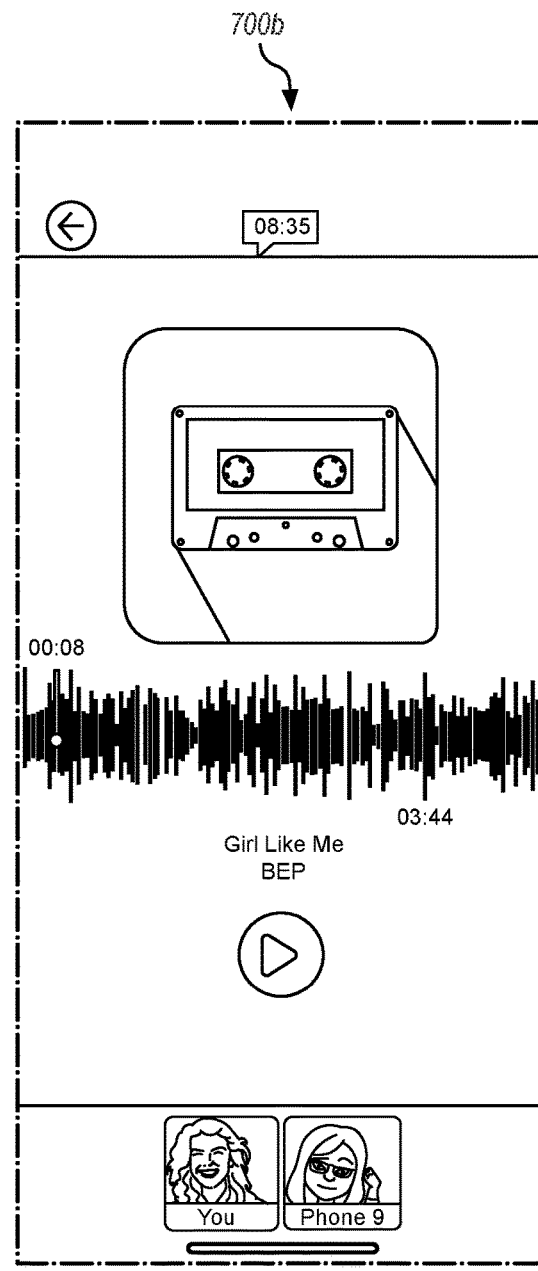

FIGS. 7A-7D shows what it looks like when a caller shares an audio file with other participants in synced and unsynced states. FIGS. 7A and 7B shows when sync mode is turned off. Interface 700a is the presenter's view that includes a button at the top of the screen to control sync mode. Interface 700b is the viewer's screen, which does not have the sync button. When sync mode is off, all participants can listen and control playback of the audio file on their own screen, including scrubbing, pausing, turning sound on/off, control the volume etc. Here, they are playing different points of the song, at the same point in time.

Figure 7C:
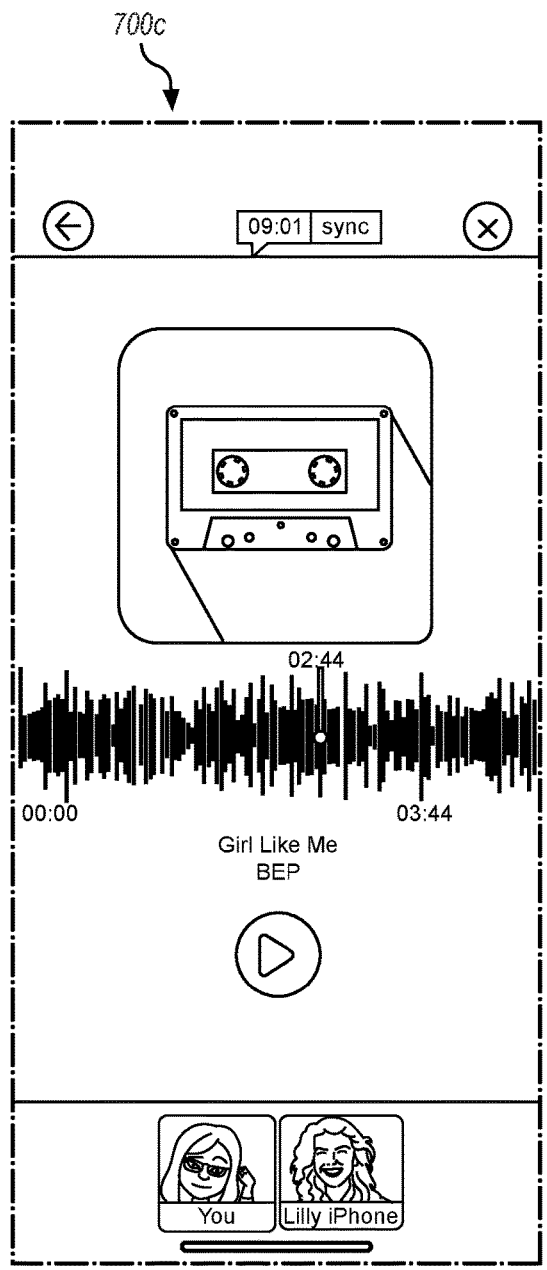
Figure 7D:
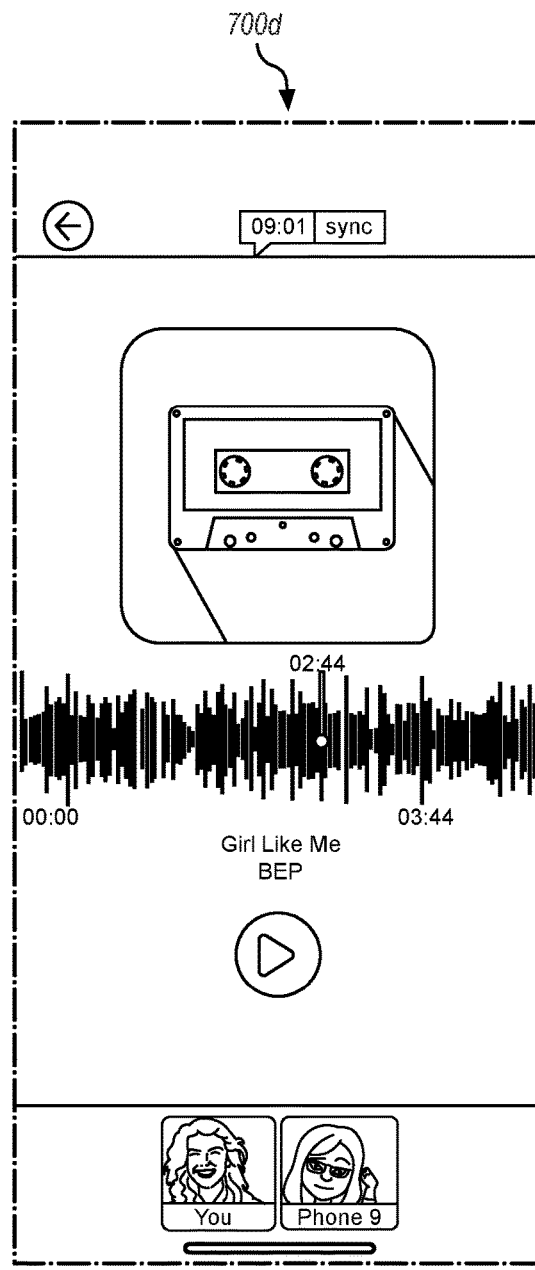

FIGS. 7C and 7D show when sync function is turned on. All participants will snap to the same section of the audio waveform and hear the same audio as the presenter as she controls the playback. Only the presenter's interface 700c will have the ability to scrub across the audio's timeline. Note the time stamp on the call is the same on both interface 700c, 700d to show that this is simultaneous.

Figure 8A:
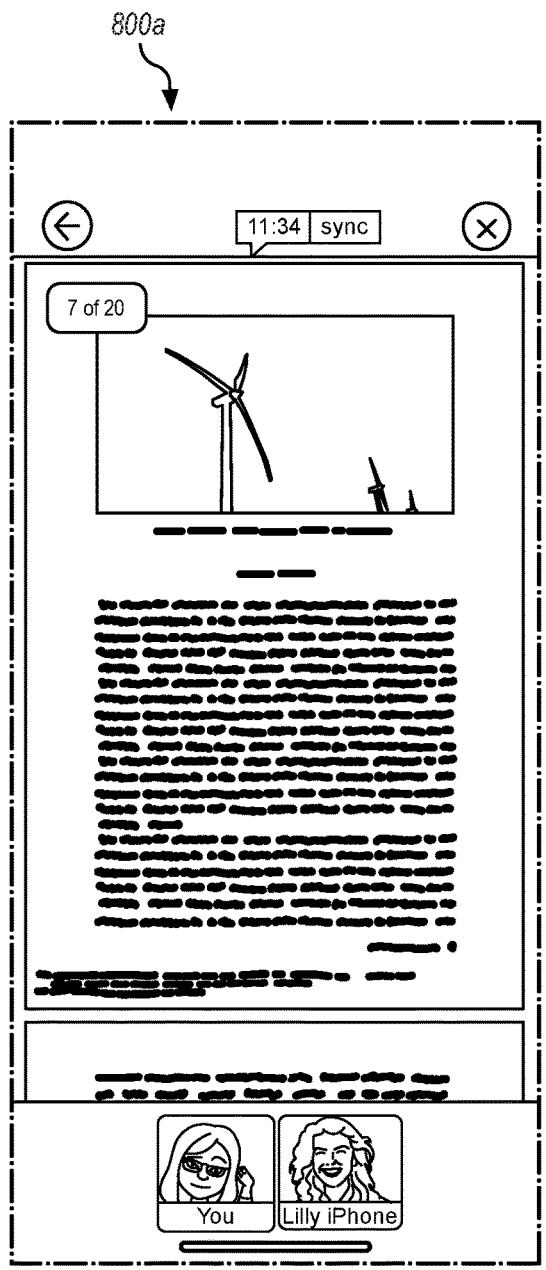
FIGS. 8A-8D illustrate user interfaces for a system for dynamic syncing of content within a communication interface.
Figure 8B:
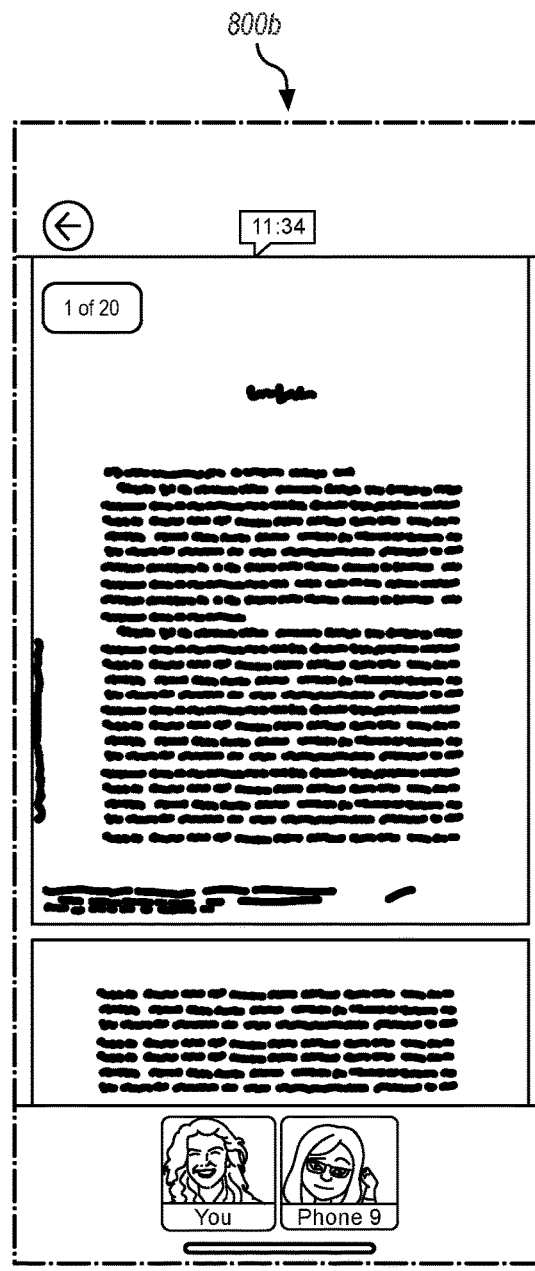

FIGS. 8A-8D show what it looks like when a caller shares a document such as a PDF, Word doc, or PowerPoint file with other participants in synced and unsynced states. FIGS. 8A and 8B show when sync function is turned off. Interface 800a is the presenter's view, which has a button at the top of the screen to control the sync function. Interface 800b is the viewer's screen, which does not have the sync button. When sync mode is off, all participants can view, zoom and scroll to different pages of the document at their own pace. Here they are viewing different pages of the document at the same point in time.

Figure 8C:
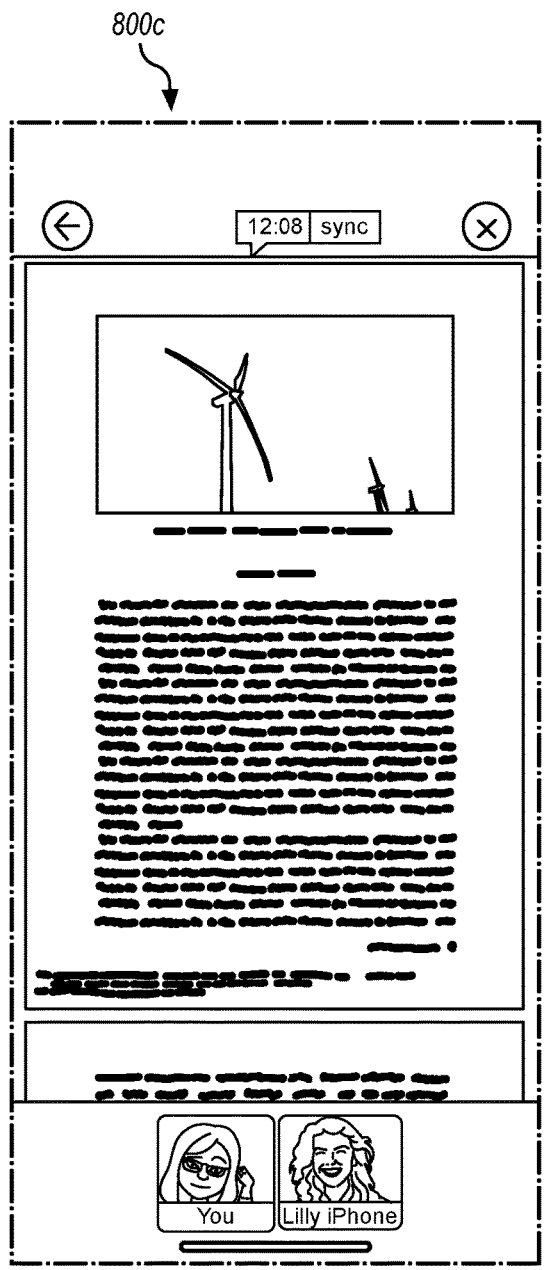
Figure 8D:
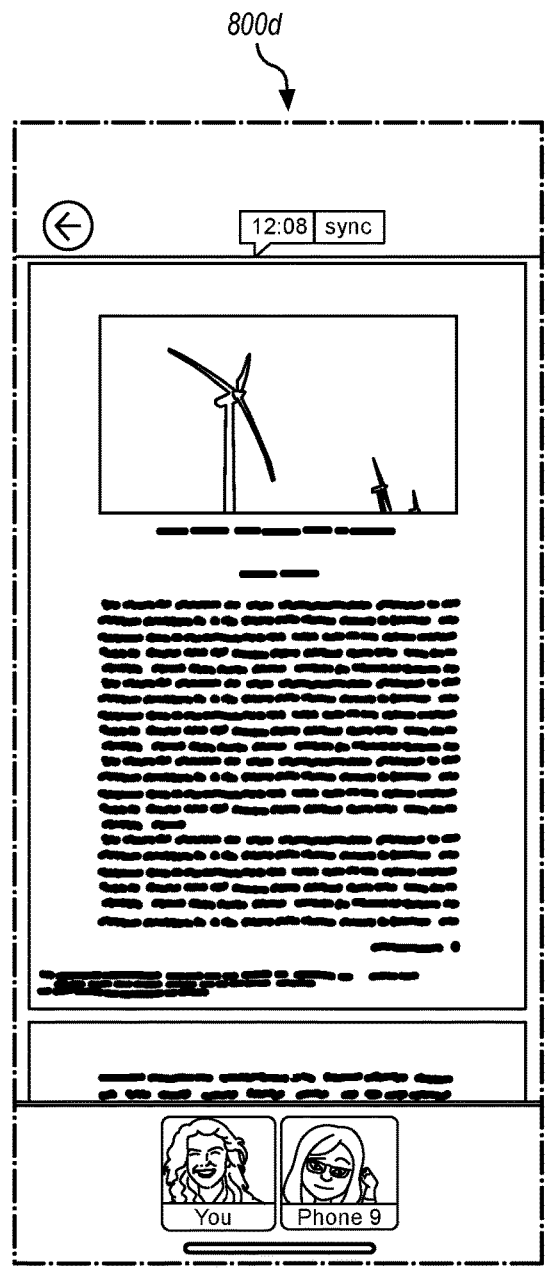

FIGS. 8C and 8D show when the sync function is turned on. All participants will snap to the same page and mirror the view of the presenter. As the presenter scrolls on interface 800c scrolls, the viewers will also see the document scroll on interface 800d. If the presenter zooms on a specific pixel, the viewers will also see their screen zoom in on the same pixel.

Note the time stamp on the call is the same on both screens to show that this is simultaneous.

Figure 9A:
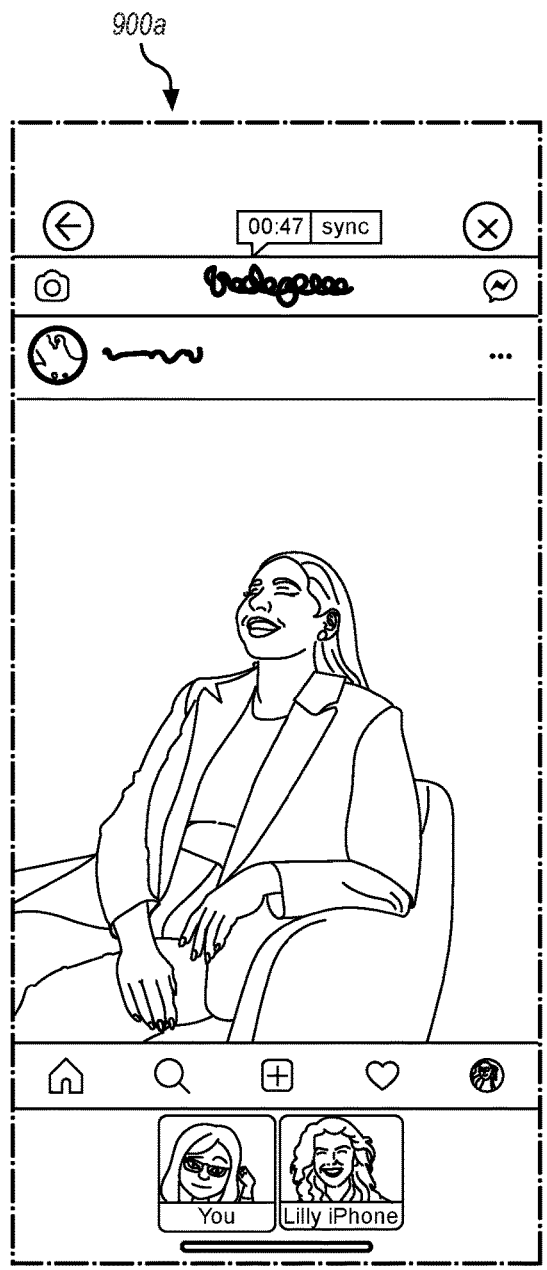
FIGS. 9A-9D illustrate user interfaces for a system for dynamic syncing of content within a communication interface.
Figure 9B:

FIGS. 9A-9D show what it looks like when a caller shares a web page with other participants in synced and unsynced states. FIGS. 9A and 9B show when the sync function is turned off. Interface 900a is the presenter's view, which has a button at the top of the screen to control sync mode. Interface 900b is the viewer's screen, which does not have the sync button. When sync mode is off, all participants can view, zoom and scroll to different parts of the web page at their own pace. Here they are viewing different sections of the a webpage feed at the same point in time.

Figure 9C:
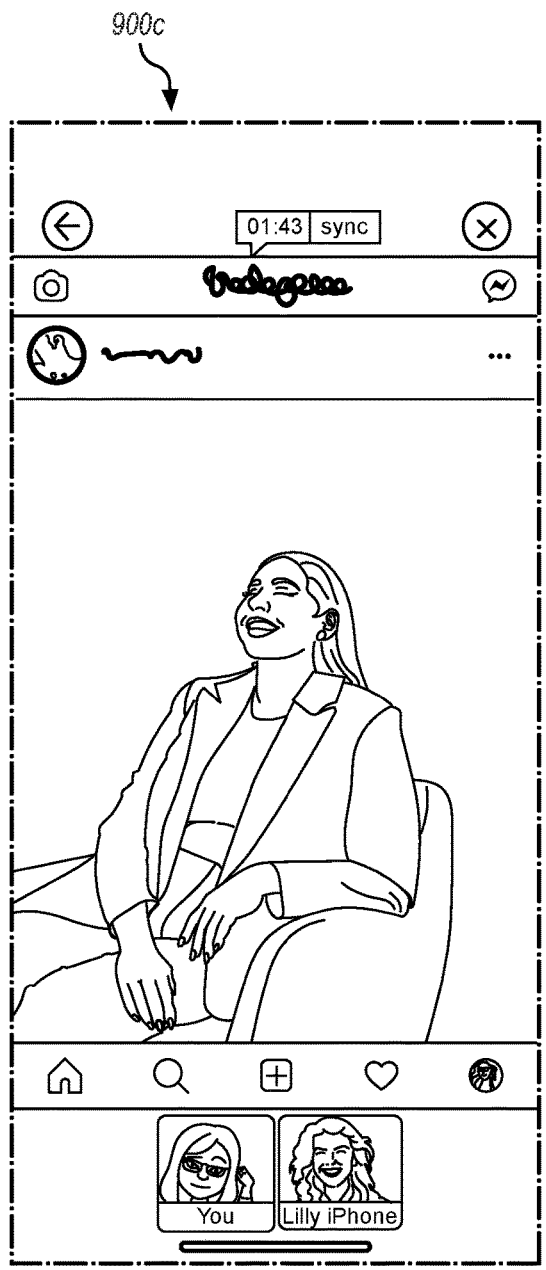
Figure 9D:
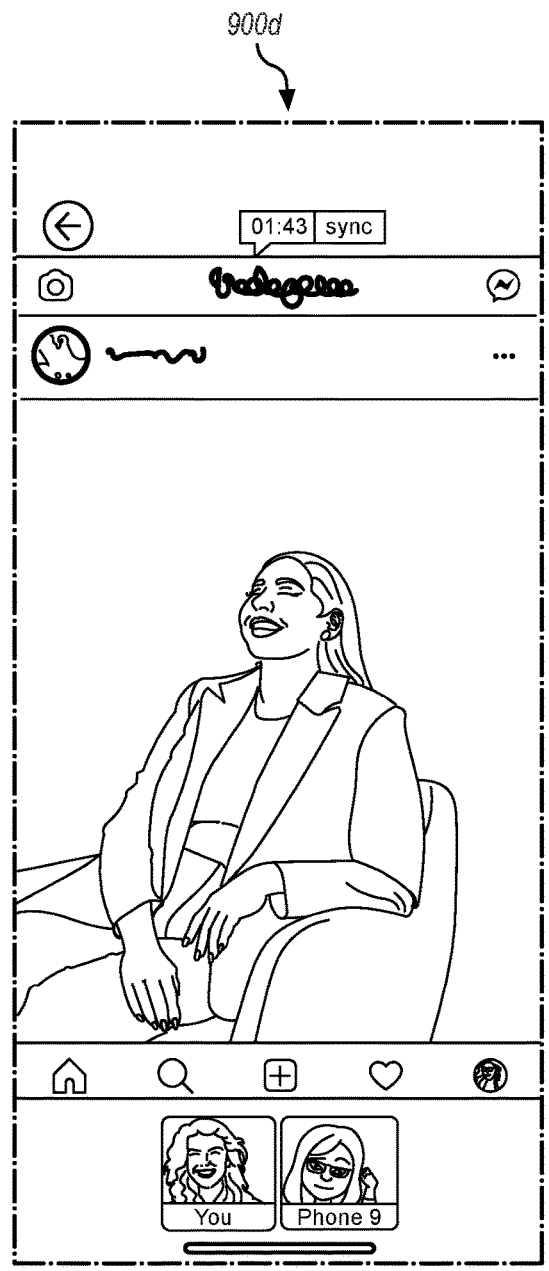

FIGS. 9C and 9D show when the sync function is turned on. All participants will snap to the same scrolling position and view of the presenter (shown in interface 900c). As the presenter scrolls, the viewers (shown in interface 900d) will also see the page scroll. If the presenter zooms in on a specific pixel, the viewers will also see their screen zoom in on the same pixel. Note the time stamp on the call is the same on both screens to show that this is simultaneous.

Figure 10A:
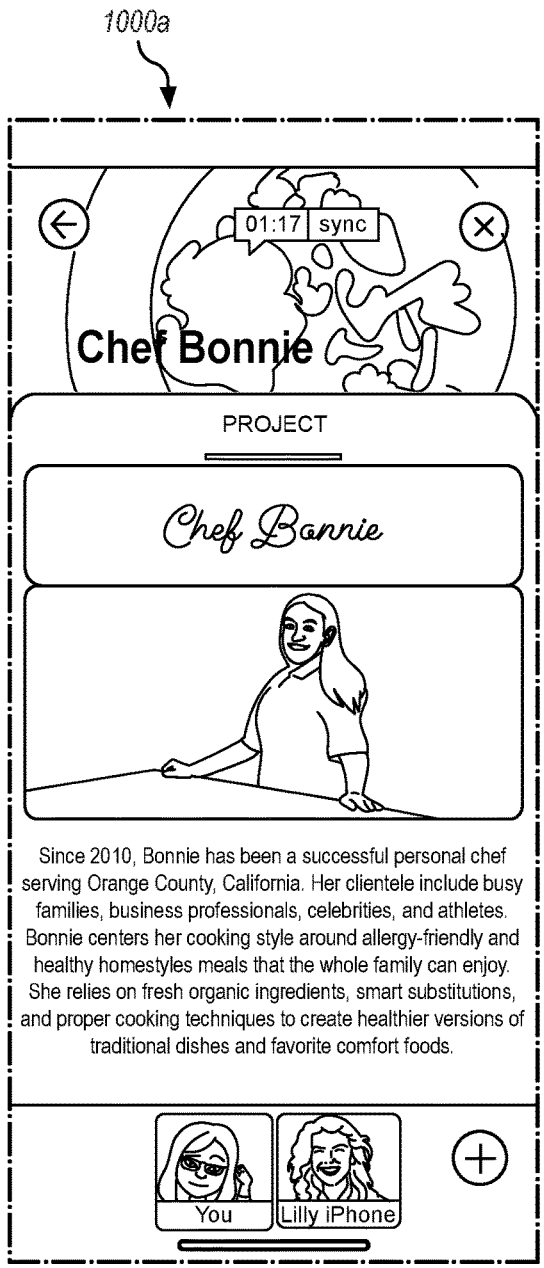
FIGS. 10A-10D illustrate user interfaces for a system for dynamic syncing of content within a communication interface.
Figure 10B:
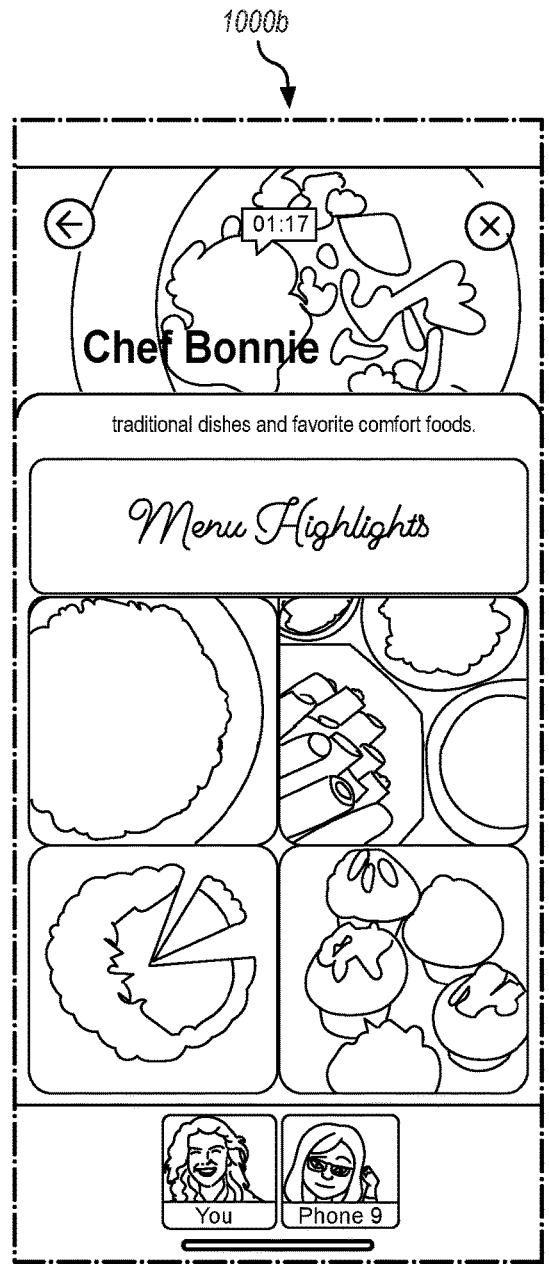

FIGS. 10A-10D show what it looks like when a caller shares a FYI™ Project with other participants in synced and unsynced states. FIGS. 10A and 10B show when sync mode is turned off. Interface 1000a is the presenter's view, which has a button at the top of the screen to control sync mode. Interface 1000b is the viewer's screen, which does not have the sync button. When the sync function is off, all participants can view, scroll, zoom, or select any object in the Project page. Here they are viewing different sections of the Project.

Figure 10C:
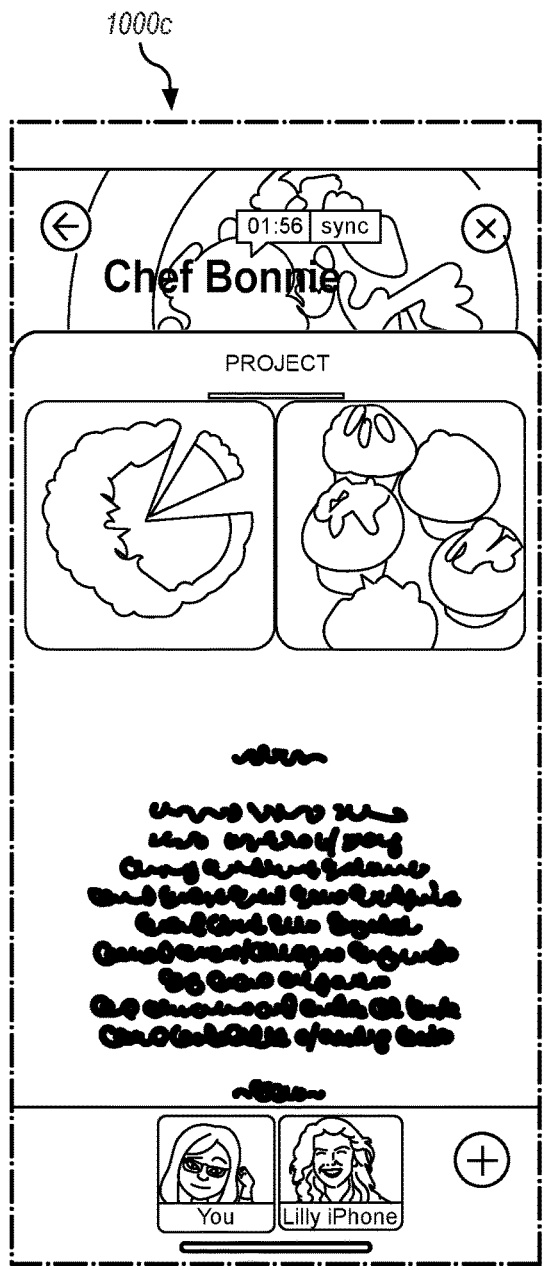
Figure 10D:
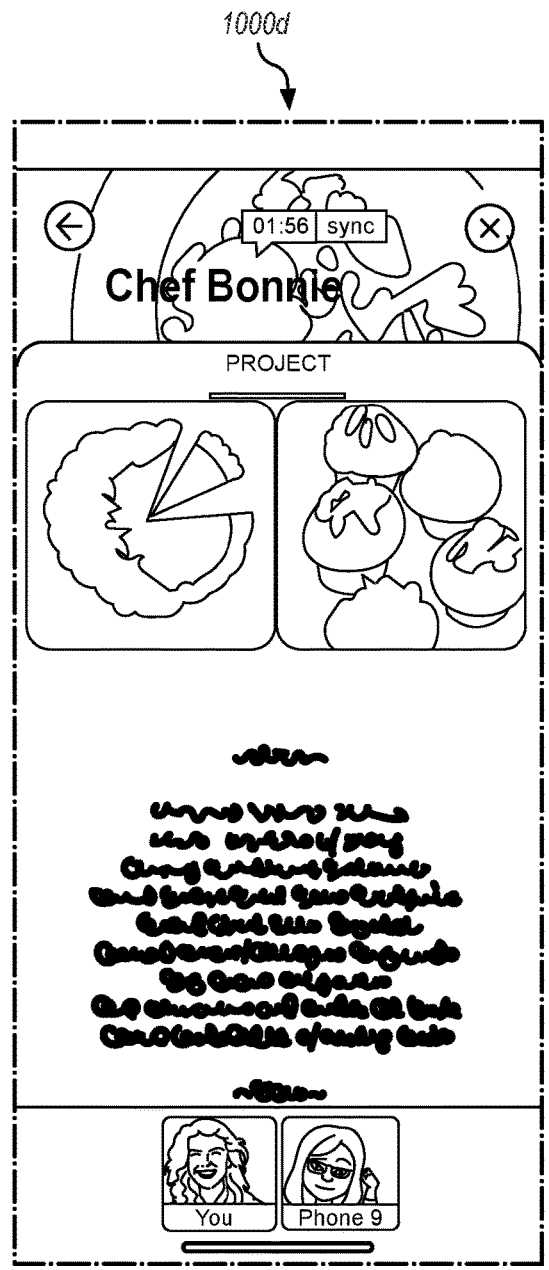

FIGS. 10C and 10D show when sync mode is turned on. All participants will snap to the same scrolling position and view as the presenter. As the presenter scrolls (shown in interface 1000c), the viewers (shown in interface 1000d) will also see the page scroll. If the presenter zooms on a specific pixel, the viewers will also see their screen zoom in on the same pixel. Note the time stamp on the call is the same on both screens to show that this is simultaneous.

An additional feature with projects is that if someone updates the project in real time, such as by adding a new asset or reorganizing blocks on the page, all viewers will also see it update live.

Figure 11A:
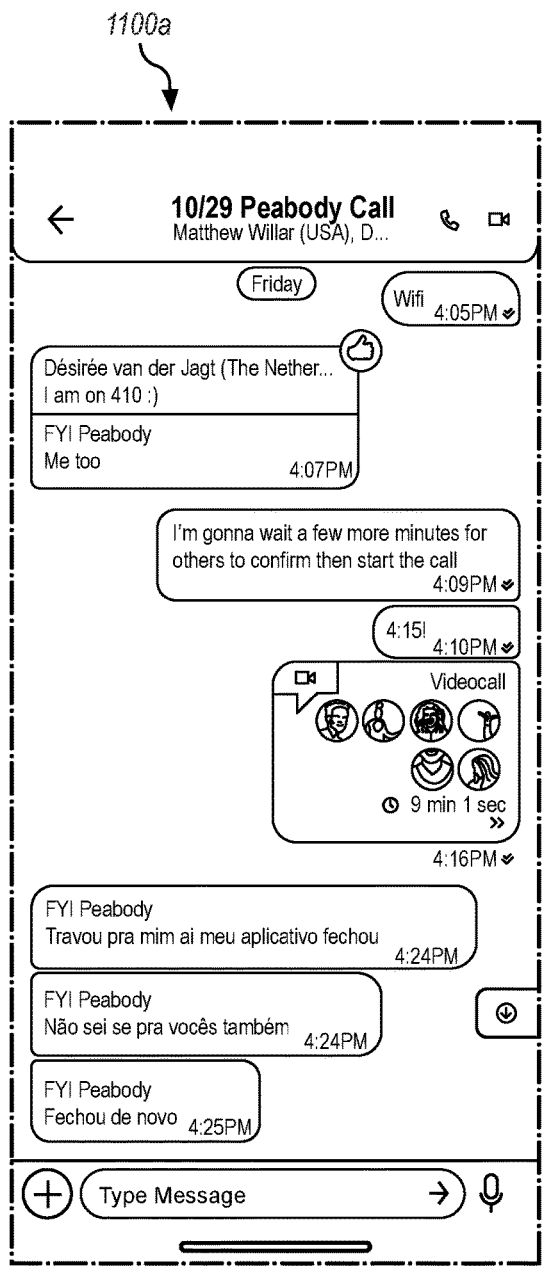
FIGS. 11A-11D illustrate user interfaces for a system for dynamic syncing of content within a communication interface.
Figure 11B:
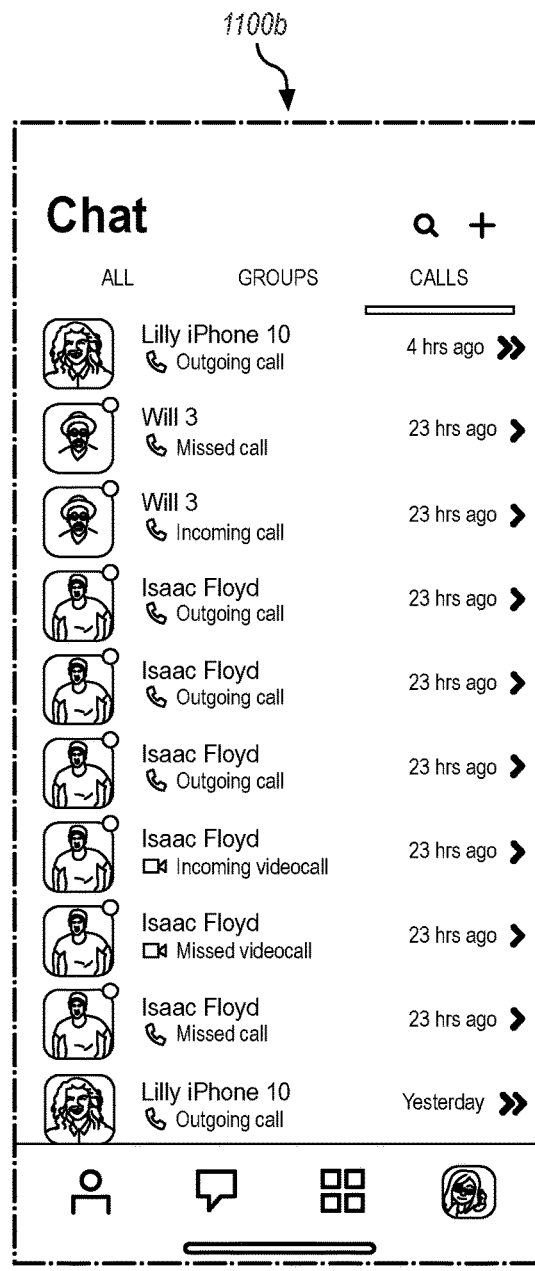

In at least one disclosed embodiment, when users share content over a call, the content lives on after the call in the users' call history. Files or links that are shared can be accessed in the record of the call and can be viewed and downloaded for further use. FIGS. 11A-11D illustrate user interfaces for a system for dynamic syncing of content within a communication interface. FIGS. 11A and 11B show how a user can access the details of a completed call and the history of the content that was shared on a call. Interface 1100a shows a chat thread and a large card that represents a call that happened amongst members in the group. Tapping on the card will open a detailed view of the call's content. Interface 1100b shows an alternate way to access call details, via the call logs screen, which shows a list of all the calls the user was on. Tapping on a specific call will also show a detailed view.

Figure 11C:
Figure 11D:
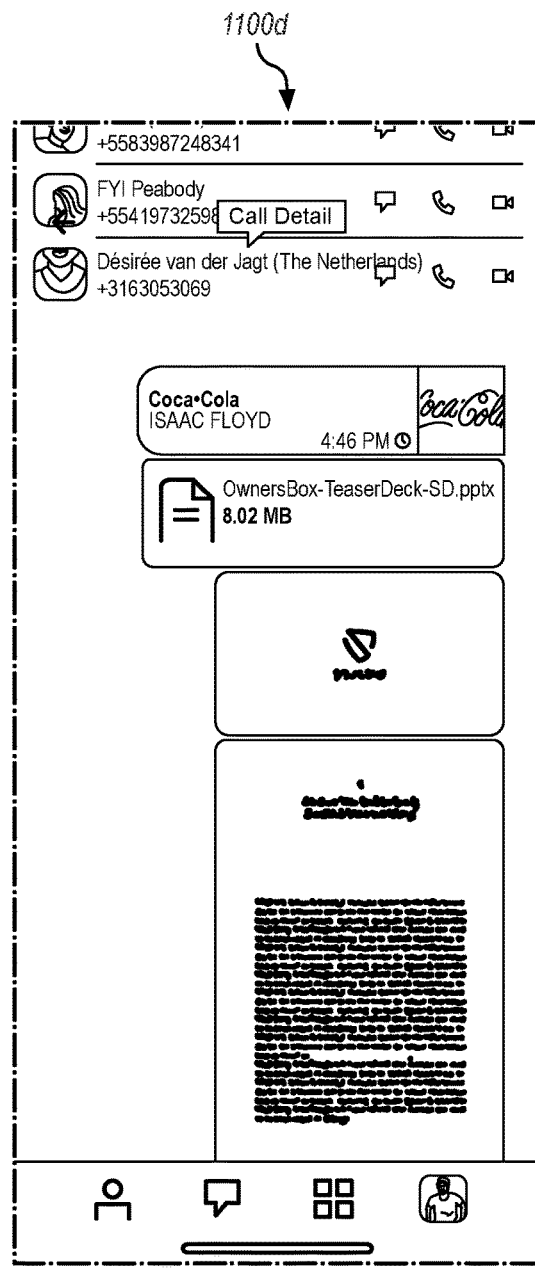

FIGS. 11C and 11D show the detailed view of a completed call. It shows a list of participants (interface 1100c), and all the content (interface 1100d) that was shared by any participant on the call, including web links, documents, images, videos, audio files, projects, and other multimedia content.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
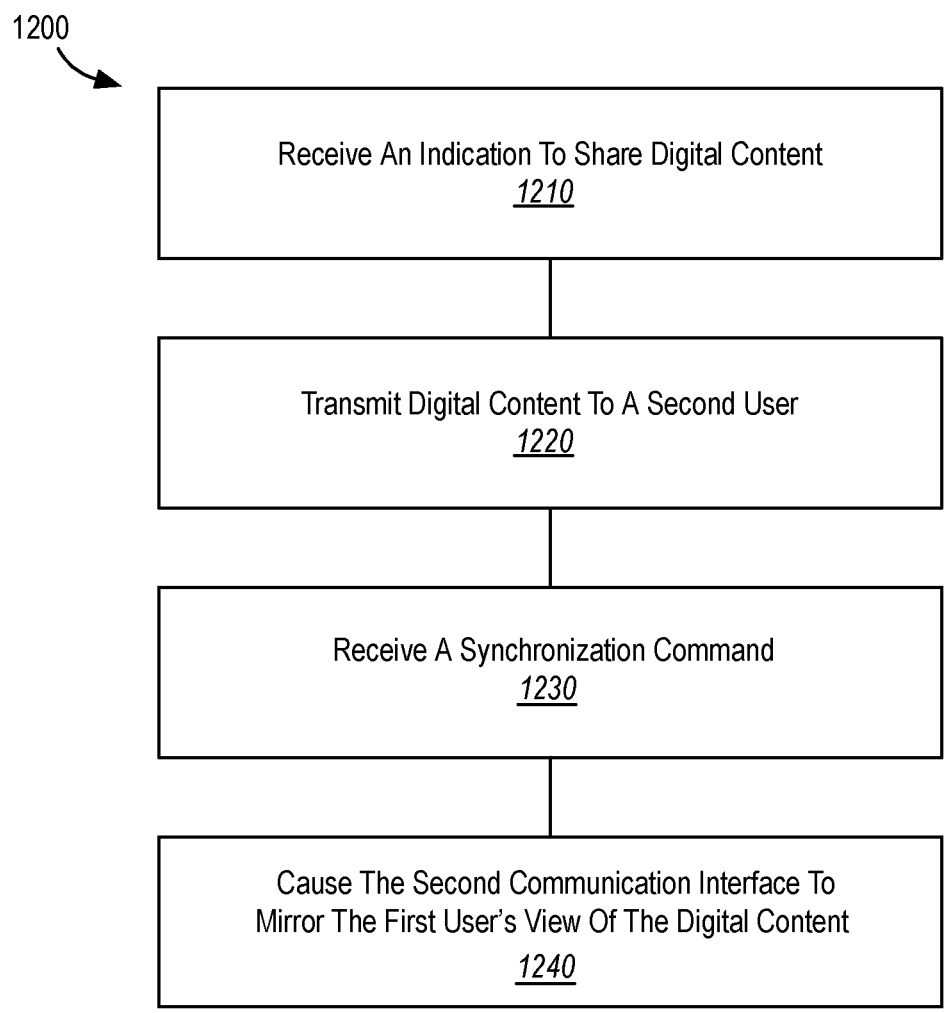
FIG. 12 illustrates a flow chart of a method for dynamic syncing of content within a communication interface.

FIG. 12 illustrates a flow chart of a method 1200 for dynamic syncing of content within a communication interface. The method may include an act 1210 for receiving an indication from a first user to share digital content with a second user through a first communication interface. Additionally, the method may include an act 1220 of transmitting the digital content to the second user. The transmitted digital content is displayed to the second user within a second communication interface. The method may also include an act 1230 of receiving a synchronization command from the first user. Further still, the method may include an act 1240 of in response to the synchronization command, cause the second communication interface to mirror the first user's view of the digital content.

Figure 13A:
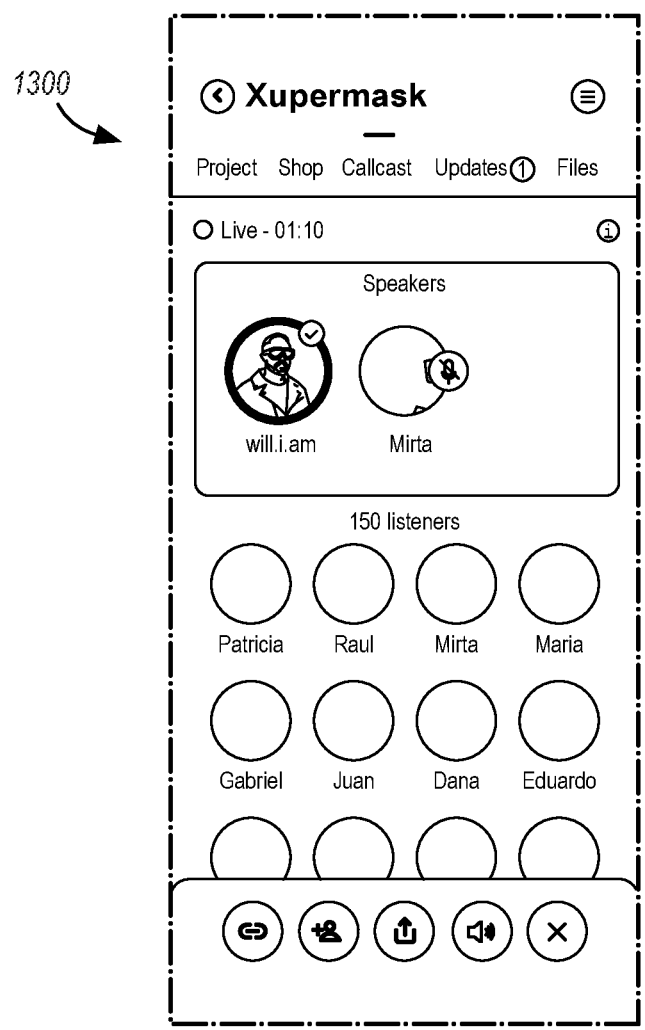
FIGS. 13A-13C illustrates user interfaces for a system for dynamic syncing of content within a communication interface.
Figure 13B:
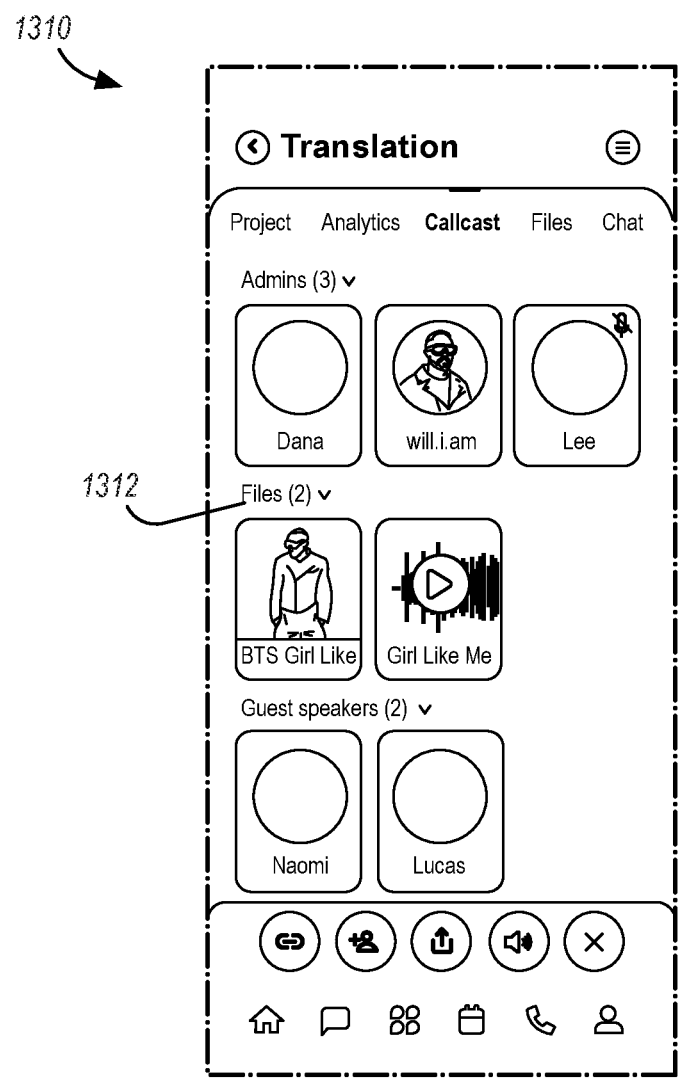
Figure 13C:
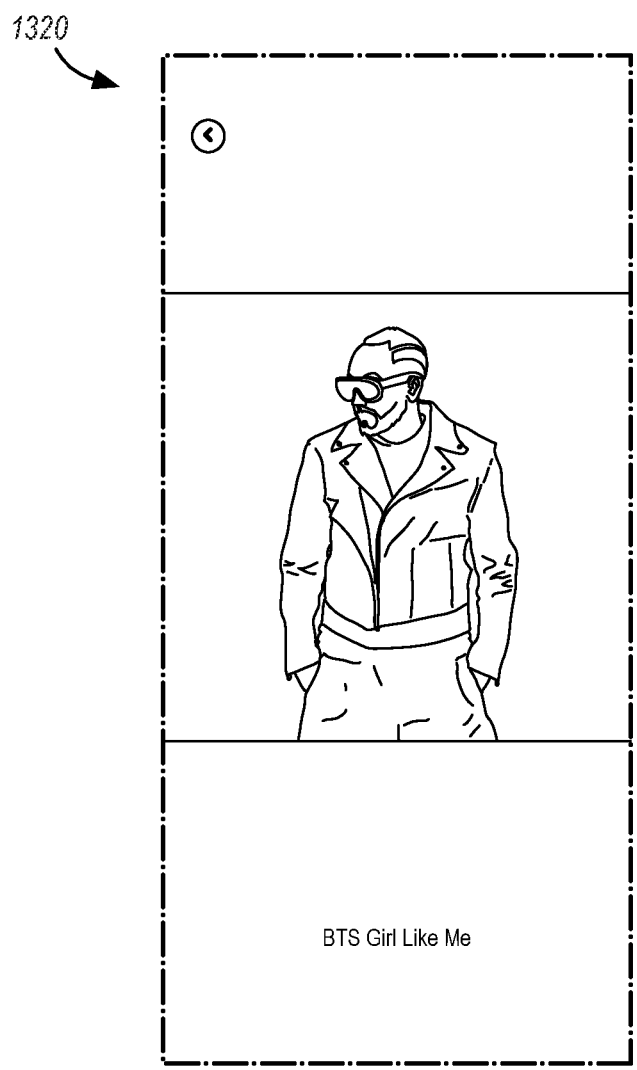

FIGS. 13A-13C illustrate various interfaces for a system for dynamic syncing of content within a communication interface. In at least one embodiment, a user is able callcast. As used herein, a "CallCast" is a live audio chat room where the hosts can also present multimedia content within the chatroom. Audience members may also be able to interact with the digital content independently while in the audio chatroom. For example, if the content is a document, then audience members may be able to scroll through the pages on their own. If the content is a video or audio file, audience members may be able to play the media file and scrub through the content at different points in the timeline of the content. If the content is a photo, the audience member can enlarge the photo and zoom in on any area of the photo.

FIG. 13A depicts an example of a CallCast interface 1300. In the depicted example, the title of the live audio chat room is "Xupermask." This user interface screen shows the standard elements of an audio chat room, with two speakers featured at the top of the room, and audience members listed underneath the speakers. A menu bar is shown at the bottom of the screen where users can access other actions.

FIG. 13B depicts an example of a CallCast interface 1310 with added media files. On depicted interface, you can see the added elements of "Files" 1312, shown underneath the speakers. The speakers in this audio chat room can choose to share files during their session by accessing a button to share media, from the menu bar. For example, two files have been shared by the speakers, a picture file and a MP3 file. Any person listening in the chat room may be able to open the files (within the interface of the room) and view them at their own pace and under their own control.

FIG. 13C depicts an interface 1320 showing an open media file (in this case the picture file from interface 1310) from a CallCast session. Audience members may be able to open files shared during a CallCast session and interact with the file at their own pace and under their own control. A file may be any type of digital content. In this example, it is a photo. But it could also be a video, audio file, document, or web link. Files may also be linked to web pages where users can further interact with content. For example, a photo may be hyperlinked to a page where users can purchase goods or services or perform other actions. As another example, a file could also be a digital music album, where users may only access the album via participation in a live CallCast and be able to purchase the album only through their participation in the CallCast.

As explained above, one or more participants in the CallCast may have the ability to activate a sync mode that causes all of the other participants in the CallCast to view the initiating user's screen. Similar to that explained above, when a participant initiates the mode, that participant's device communicates mapping data to the other participant devices in the CallCast. The other participant devices use the mapping data to render the same view that the initiating participant is viewing. In at least one embodiment, the ability to initiate the sync mode is reserved to only specific participants. For example, only participants with ownership rights over a given file may have the ability to initiate a sync mode for that file. Whereas other viewers may just have viewer rights on the file and be prohibited from initiating the sync mode.

In an additional or alternative embodiment, the disclosed system provides improved annotation functionalities. For example, users may be familiar with leaving annotations on documents, to provide feedback to the document creator on what edits need to be made. Examples include track changes in word processing documents and leaving comments or sticky notes in the margins.

Disclosed embodiments improve upon this system. For example, consider a video file that is shared amongst a team of video editors. To provide better feedback on changes that need to be made on specific frames of the video, an editor can select a frame from the video's timeline and leave an audio message that is mapped to the timestamp of that frame, instead of written comments. The audio message that is captured will be saved as a new audio file that is linked to the original file to be edited. There can be a visual marker on the timeline UI of the video file to show that an audio comment has been left at a specific timestamp.

Similarly, audio annotations can be left on a picture file. A user may select a specific pixel of the picture file to leave an annotation. There would be visual markers to show where audio comments have been left. In both examples, the system maps audio annotations to specific locations in a document such as timestamps and pixels, rather than layering audio over the whole document.

Similar functionality can also extend to documents. For example, users may be familiar with presenting documents on a conference call via screensharing. Some services also allow participants to mark up or add annotations to the screen, to provide feedback to other members on the call. However, usually these markups are captured as overlays on the screen content and saved as screenshots, which limits the file to the content displayed on the screen of the user performing the markup, rather than the scope of the whole file. In at least one embodiment, the markup is saved along with all the content of the original file in question, rather than just a screenshot of whatever is displayed from the marker's view.

For example, if a 3-page document is shared on a call and visually marked up with notes and annotations during the call, the participants will have the ability to save the entire document as one file that shows all the markups on all pages, instead of having to download multiple screenshots of the file in various sections. Another example is marking up a photo shared on a call. One participant on the call may zoom into the photo to leave a more detailed markup. When the markup is saved as a new file, it will show the annotations within the context of the entire image, and not just a screenshot of the zoomed-in view. Users may also be able to leave audio annotations on a file during calls. An audio annotation will be saved as a new file but linked to the original file being edited via a record in the user's call history within the conference call application.

In additional or alternative embodiment, the system is configured to combine a conference call interface with a media player and audio recording interface. For example, while on a conference call, one user may be sharing and playing an MP3 music file, while another user may be recording audio of their voice through their own device microphone, speaking over the playback of the music file from user one. Additional participants on the call may also be speaking over the playback audio. The end result is the creation of a new audio file that seamlessly mixes the audio captured from multiple devices and participants during a conference call with the pre-existing audio file being played on the call, which, for example, could be a backing track to a song. The audio may be communicated at a high-enough bitrate that the fidelity of the sound is on par with that of a studio recording and mixing environment. This may provide a novel way for groups of people to create original audio content together over a phone call instead of having to coordinate in a studio environment.

Further, in additional or alternative embodiments, the system provides a unique interface and system where users may store important personal documents such as IDs, insurance cards, and credit cards in a digital form that is tied to their user profile on a messenger service. In contrast to conventional systems, in at least one embodiment, the wallet is tied to a user's profile in a messenger app that can use the history of the user's contacts and communication history to verify the user's identity. The system may also log interactions from the wallet on a blockchain. An interaction could include making a transaction on a credit card, or opening a user profile on the app to show a form of ID. In the case of showing an ID, a timestamp and geolocation is added to every event where the ID is opened. In some cases, the user may be prompted to call a contact to verify their identity before proceeding. The selected contact may be selected based upon a trust record that indicates that the selected contact has previously accurately identified other individuals. The contact that is called may take an additional step to verify that the user called and spoke to them, instead of someone who may have stolen access to the user's account.

In further embodiments, the system provides for the personification of objects and spaces. In particular, disclosed embodiments provide for the personification of objects and spaces, within the context of a messenger app, so that a user can message objects and spaces with the intent to control IOT devices, or any device that can be accessed via a network connection. Spaces, as used herein, are physical spaces that contain a collection of controllable devices. For example, your home, your office, or your car can be a space. Each space contains a collection of devices that control the environment within the space, such as lights, thermostats, or other electronics.

Within the context of a messenger app, a user can add their home, office, car, or any space or device as a "contact" and be able to chat with them, in order to control devices within the space, or to monitor the space for activities. The following screens illustrate how this experience will work.

Figure 14A:
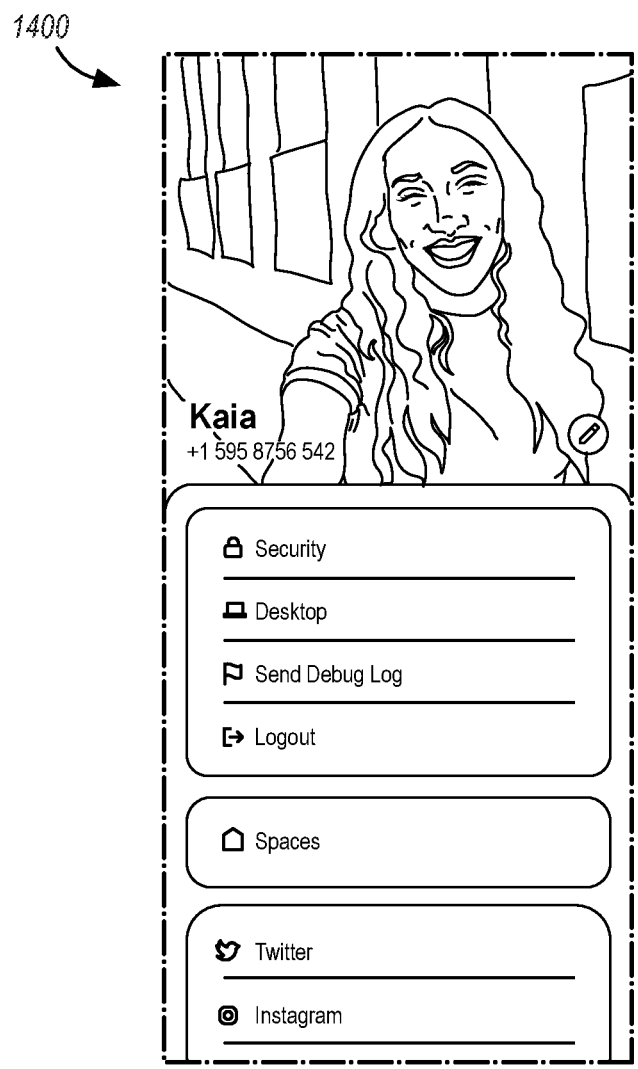
FIGS. 14A-14L illustrates user interfaces for a system for interacting with devices and spaces.

FIG. 14A depicts a user interface 1400 that shows a typical user profile screen for a messenger app. The user may be able to add 'spaces' to their account, in the same way they would be able to add other accounts, such as social media accounts or payment methods.

Figure 14B:
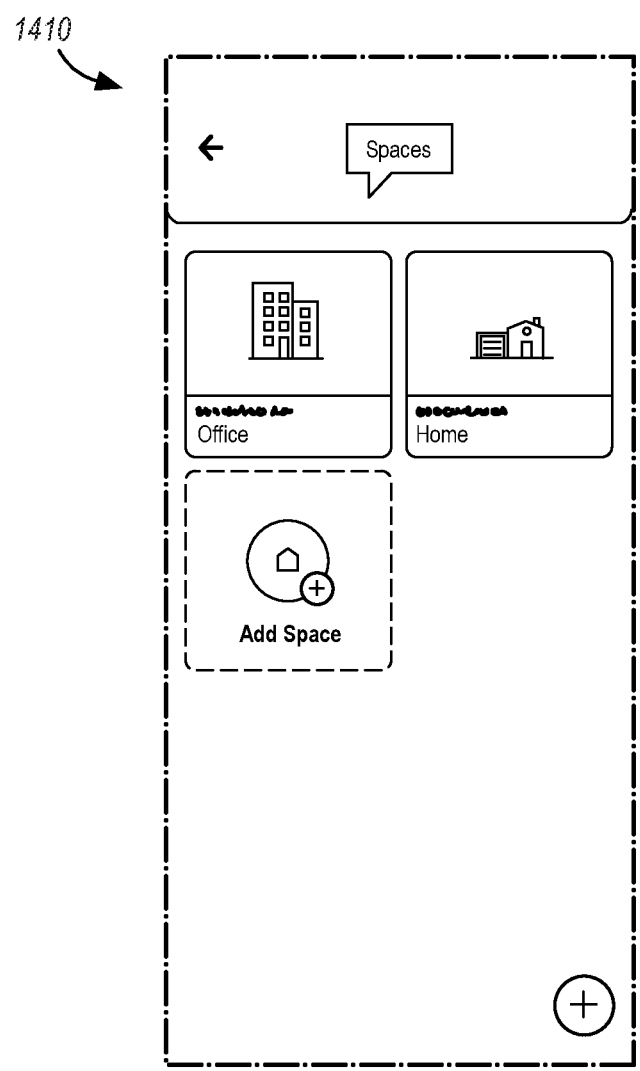
Figure 14C:
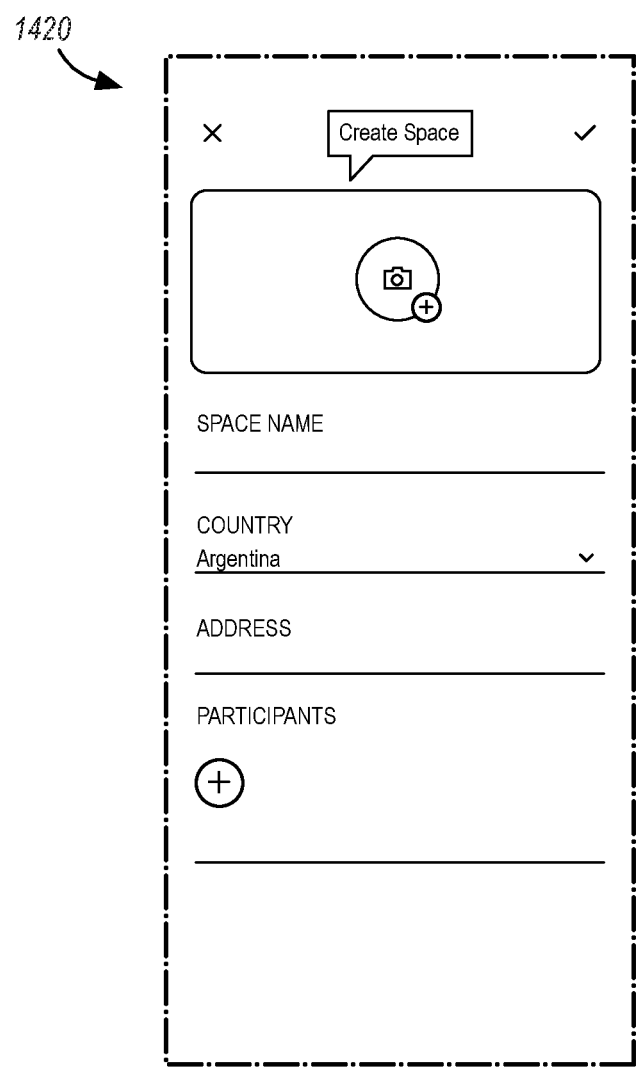

FIG. 14B depicts a user interface 1410 that shows a user can add multiple spaces to their account. This example screen shows all the spaces they have added (Office and Home), and an option to add a new space. FIG. 14C depicts a user interface 1420 that shows when a user adds a new space, the user can name it, add a banner image, and other details. The user can also add contacts to the space, to give other users access to controlling the specified space.

Figure 14D:
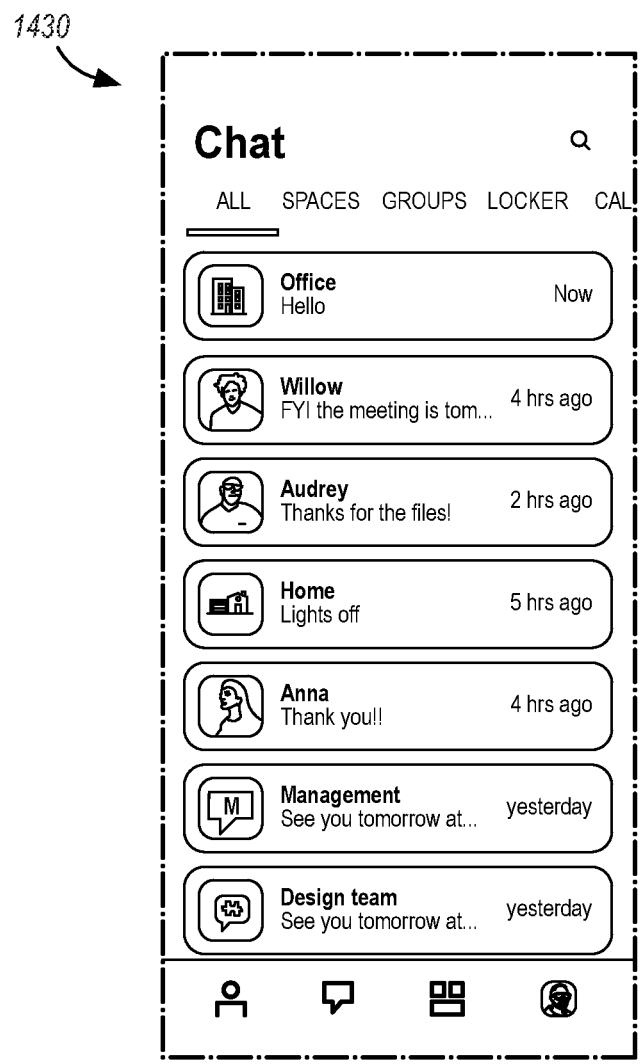
Figure 14E:
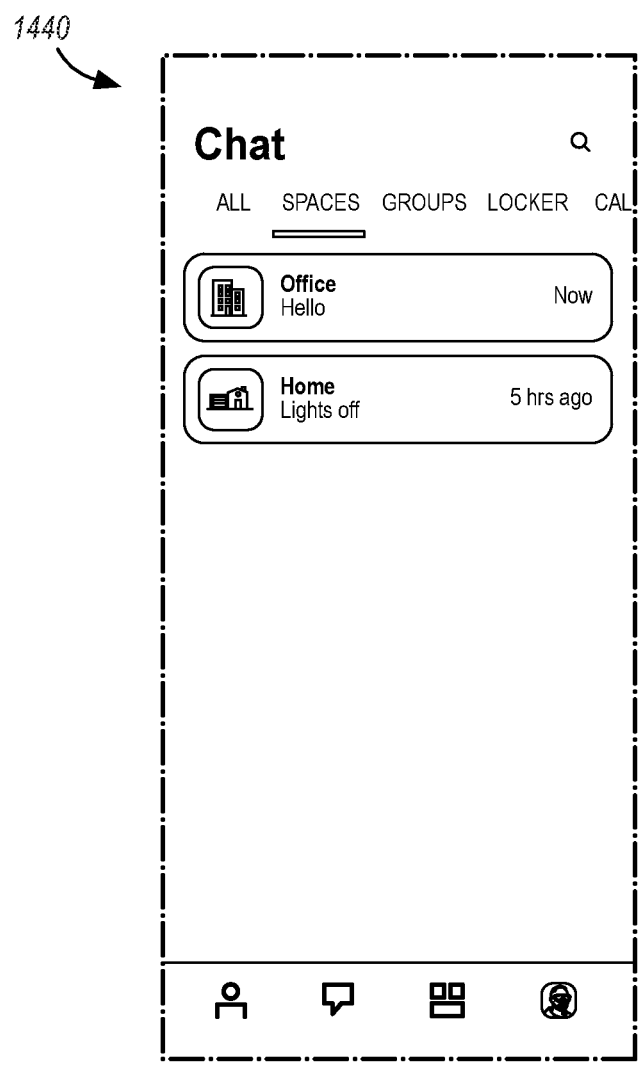

FIG. 14D depicts a user interface 1430 that shows spaces are considered contacts that the user can converse with, so the spaces may appear in the user's list of chats and conversations. In the example screen above, the user can see "Office" and "Home" in the list of chats. FIG. 14E depicts a user interface 1440 that shows an example of how a user can filter a conversation list to view spaces only.

Figure 14F:
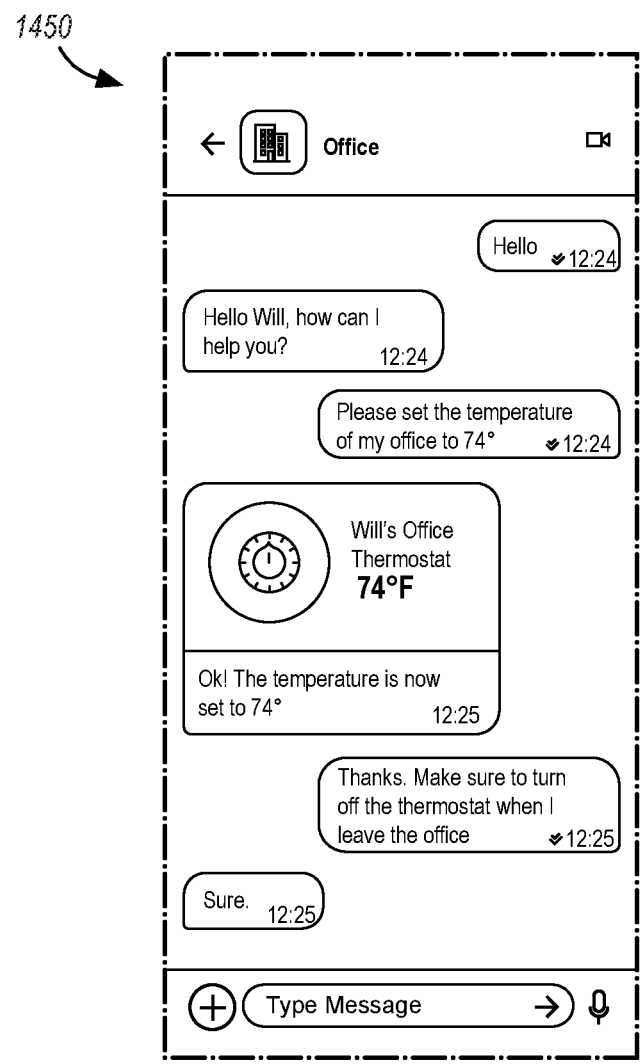

FIG. 14F depicts a user interface 1450 that shows the user may be able to send messages to their space in order to control devices within the space or gather information about the environment within the space. The user may be able to communicate with the space using natural language conversation. In this example the user can speak to the space in a conversational way, and vice versa. The space may reply to the user in a natural manner, via integration with an AI/NLU module and API integrations with devices in the space, such as a thermostat. In this example, the user is asking to set the temperature at their space called "Office", and the office may respond once that action is completed.

Figure 14G:
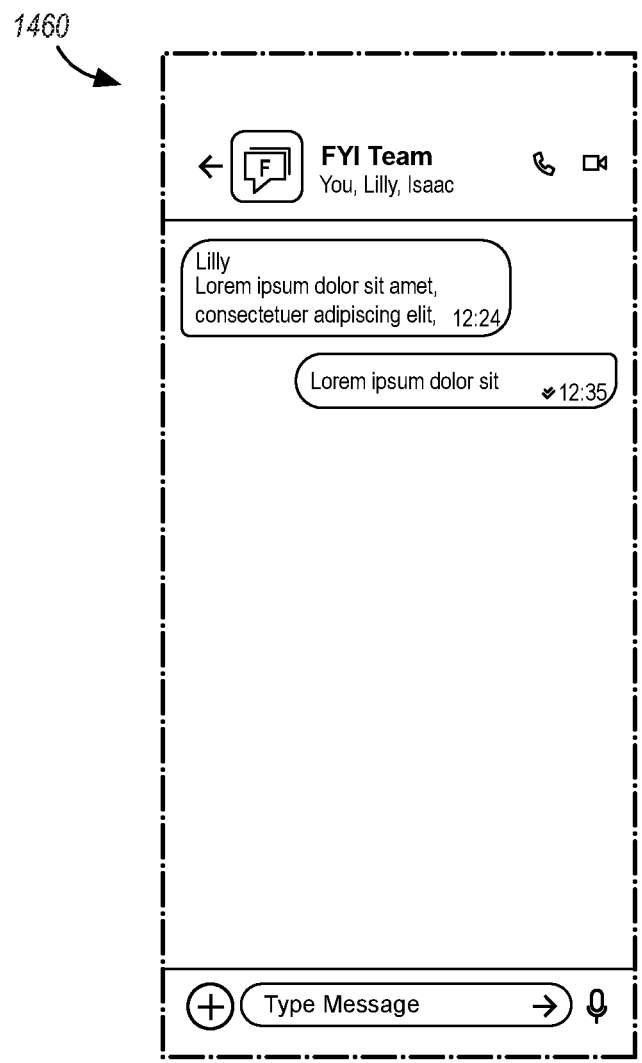
Figure 14H:
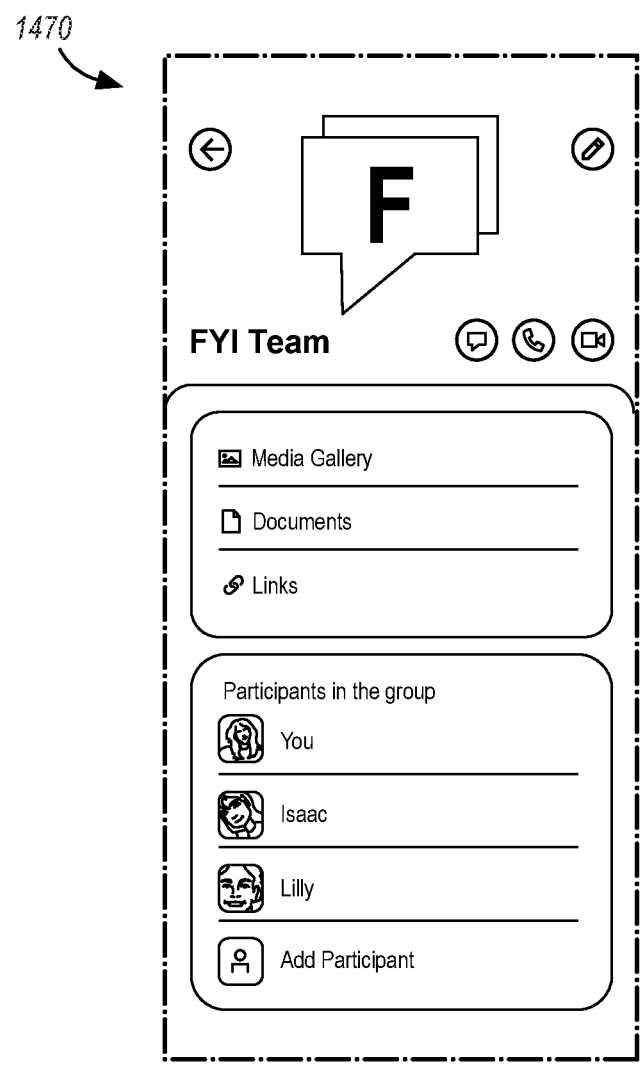
Figure 14I:
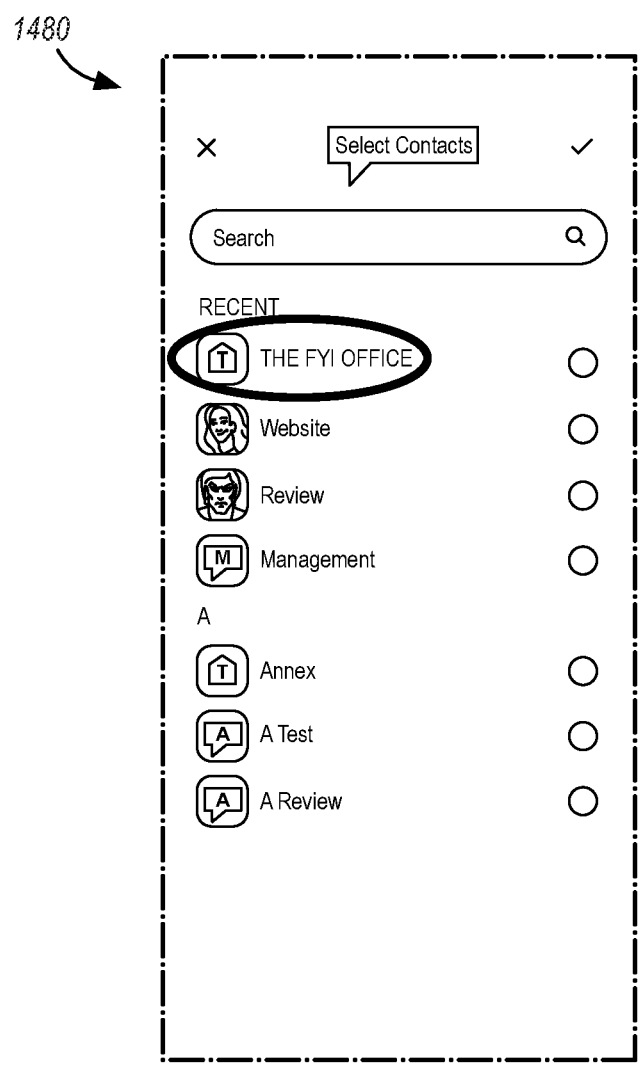

FIGS. 14G-14I depict user interfaces 1460, 1470, 1480 that show a series of behavior of adding a space to a group chat. User interface 1460, in FIG. 14G, shows a typical group chat UI with 3 participants ("You, Lilly, Isaac"). FIG. 14H depicts a user interface 1470 that details of a group chat, including the current participants. Tapping on "Add Participant" will add new members. FIG. 14I depicts a user interface 1480 that shows when the user presses on the "Add Participant" button, the user will see a list of contacts. The user's spaces will also appear in the list. In this example, the user can add "The FYI Office" to this group chat.

Figure 14J:
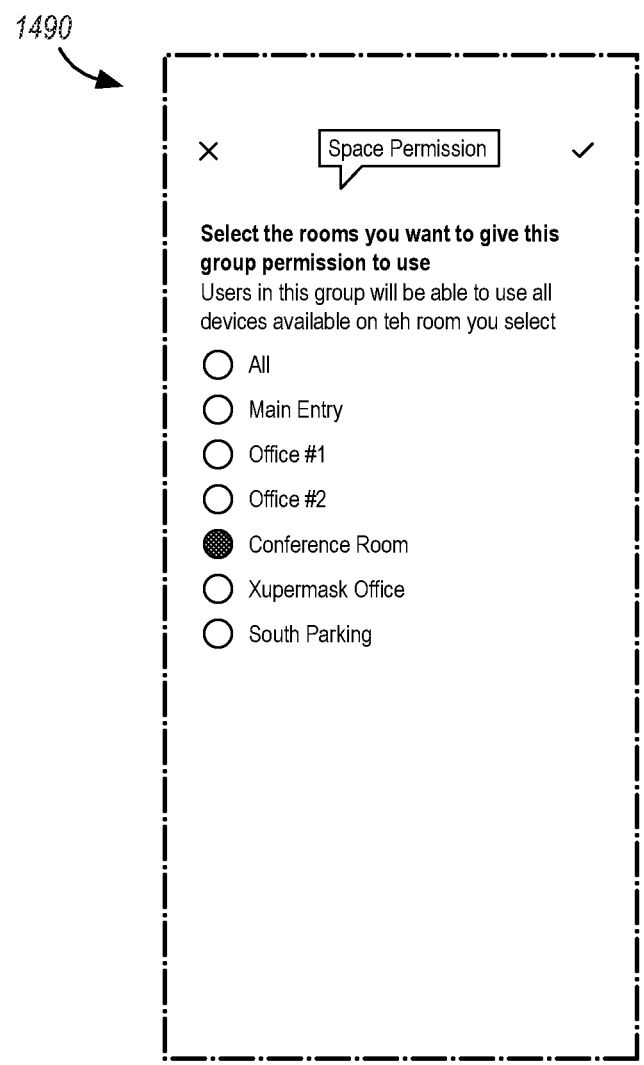
Figure 14K:
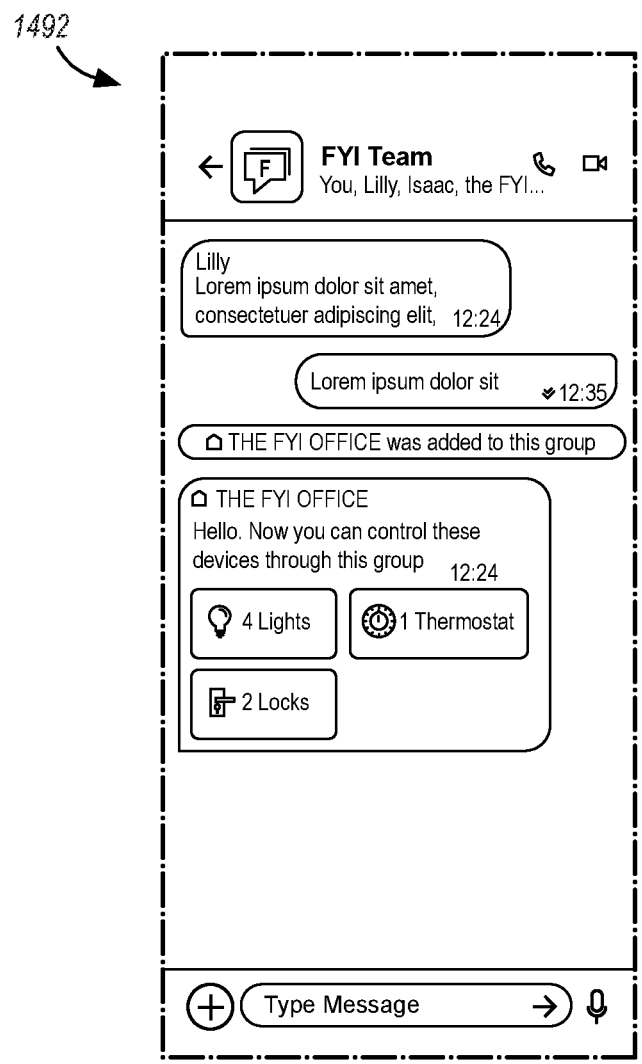
Figure 14L:
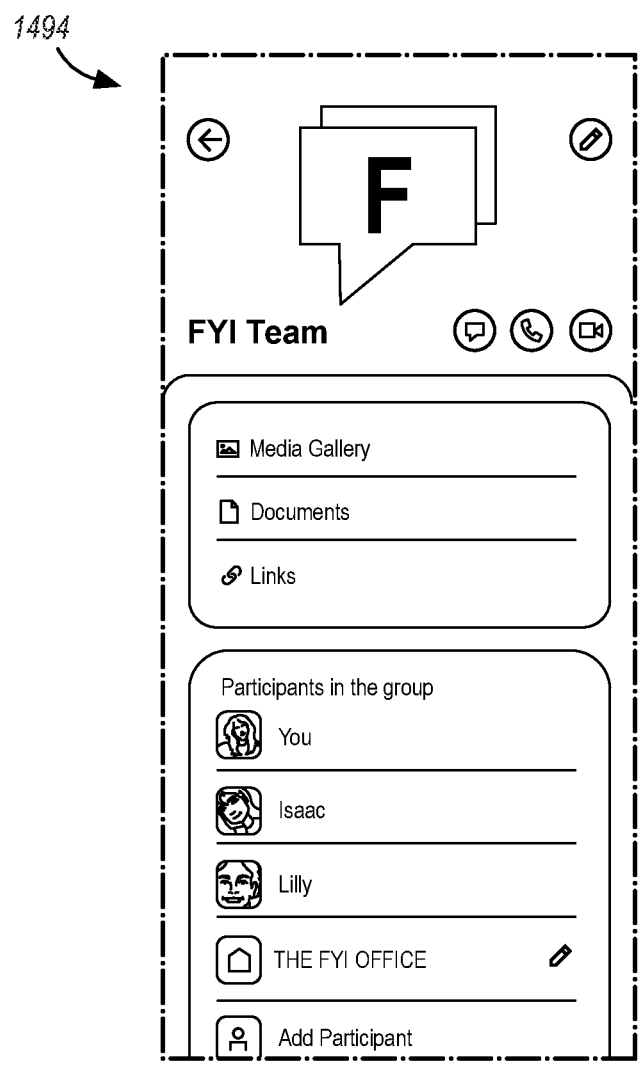

FIG. 14J depicts a user interface 1490 that shows after the user selects "The FYI Office" to add to a group chat, the user can also select which rooms or subspaces to allow other group chat members to control. Here, only "Conference Room" is selected. The other members of the chat will only be able to communicate with the Conference Room. FIG. 14K depicts a user interface 1492 that shows once you add THE FYI OFFICE to this group chat, the other members will be able to interact with it as well. They will be able to control devices in the designated space by chatting with it. They will be able to control only the devices or subspaces in which you gave them permissions for. The owner or admin of the space would be able to modify these permissions at any point in time. FIG. 14L depicts a user interface 1494 that shows when the user looks at the group details screen again, the user will now see THE FYI OFFICE in the list of participants.

Group chats that include a space can unlock new ways to communicate, as well as innovative ways for controlling devices. Adding AI speech recognition, image recognition, facial recognition, machine learning and other data analysis to the chat enables very powerful and dynamic new ways to control devices, for a richer and smoother user experience. For example, a user may be hosting a guest at the user's house. The user can add the guest to a group chat with the house. Within the chat, the user can ask the guest to share a photo of himself, so that the house may recognize his face and be able to let him into the house when he arrives, by controlling a smart lock. The house can also add the guest's face to the security camera software, so that cameras will also recognize this person as a guest and not an intruder. The guest may also send a picture of his car in the chat, so that the house recognizes this vehicle for access to the garage. This system incorporates image recognition and facial recognition so that spaces in the chat can recognize relevant people and objects. The system may also enable objects to recognize voices. Users should be able to leave voice messages to objects, and objects can discern users based on their voice. After the guest is done with their stay, the user can inform the house that the guest is leaving, and the house can remove the guest from access to the property.

In the context of an office, the user can add certain employees to a group chat with a space such as a conference room. The employees could then book time in the conference room or ask when there are open times available. Employees may also tell the conference room what kind of A/V setup they need for their meeting or what they would like the temperature of the room to be, etc. The user may also be able to add multiple spaces or objects to a group chat, and they may be able to communicate and interact with each other. For example, consider the following use case of adding the user's house and the user's car to a group chat. The car can communicate in the chat, that it is within a certain distance of the house. The house can then take that cue to turn on the lights or heating or other appliances, moments before the car arrives. Accordingly, in at least one embodiment where a user would want to share information between different spaces, objects and devices, the user can put them on a group chat.

Figure 15A:
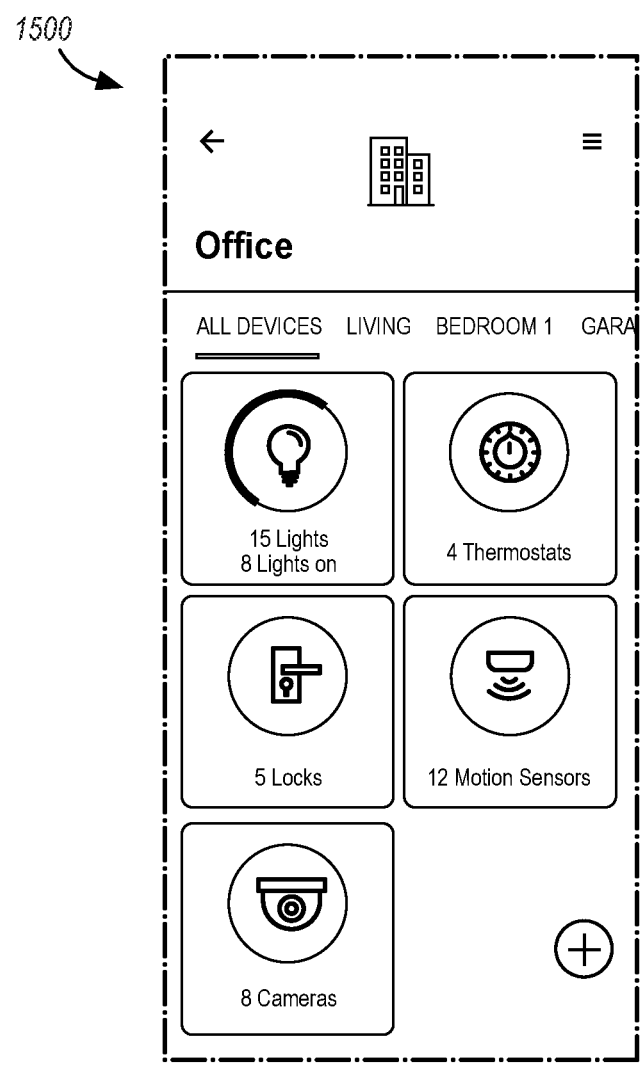
FIGS. 15A-15D illustrates user interfaces for a system for interacting with devices and spaces.
Figure 15B:
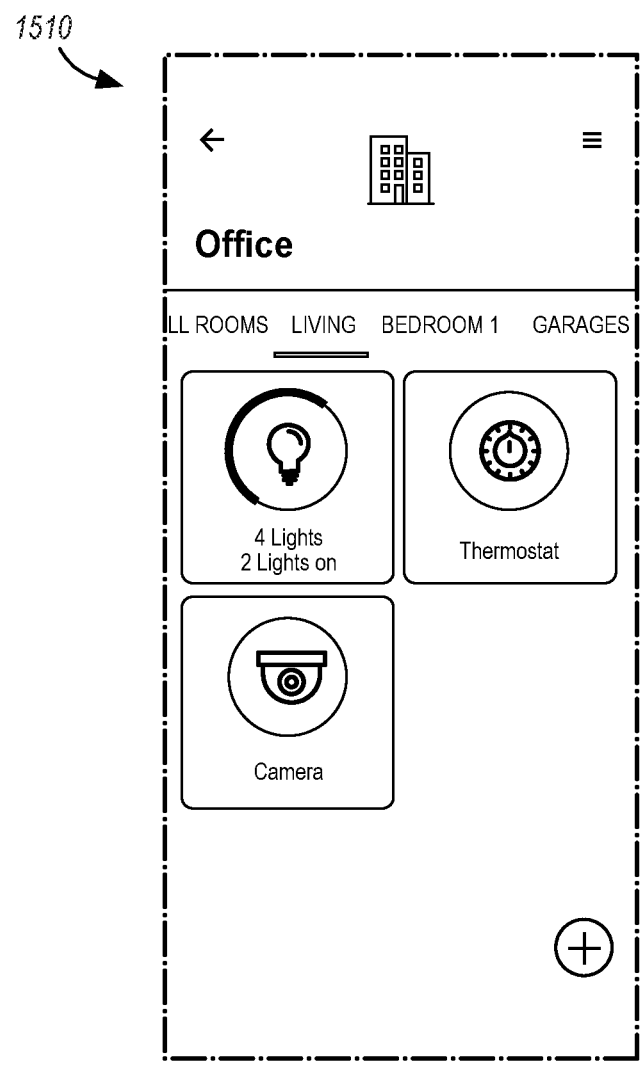

FIG. 15A depicts a user interface 1500 that shows that aside from controlling spaces via chat, the user will also be able to access a control panel view for each space, which can show all the devices within the space. In this view, the user can access direct device controls. FIG. 15B depicts a user interface 1510 that shows the control panel can also be filtered by room or subspace (bedroom, kitchen, garage etc.). Each room shows the specific devices contained in each room.

Figure 15C:
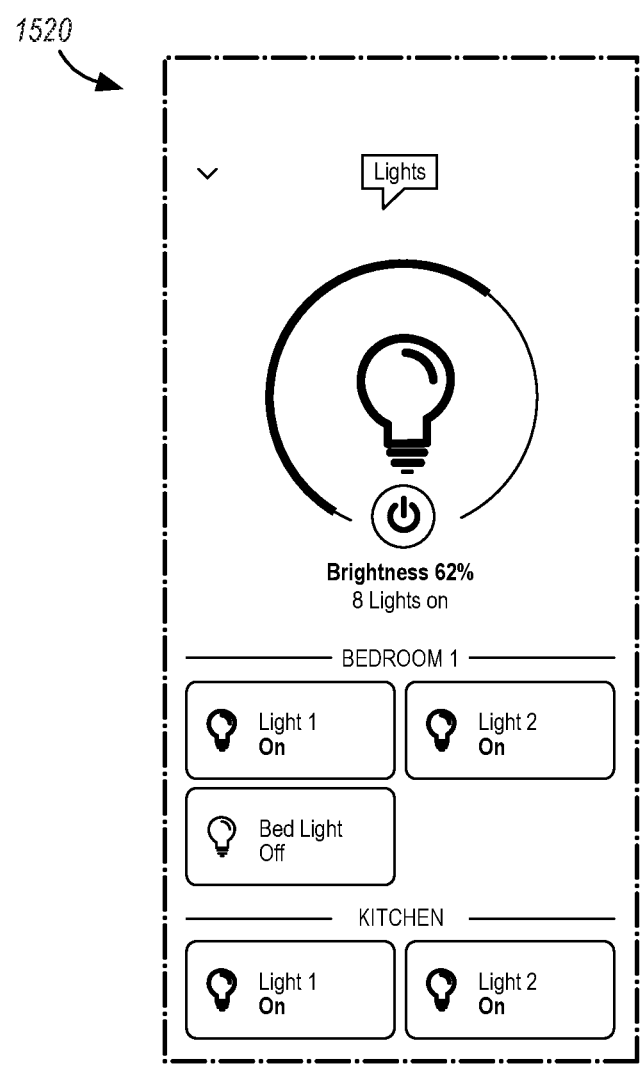
Figure 15D:
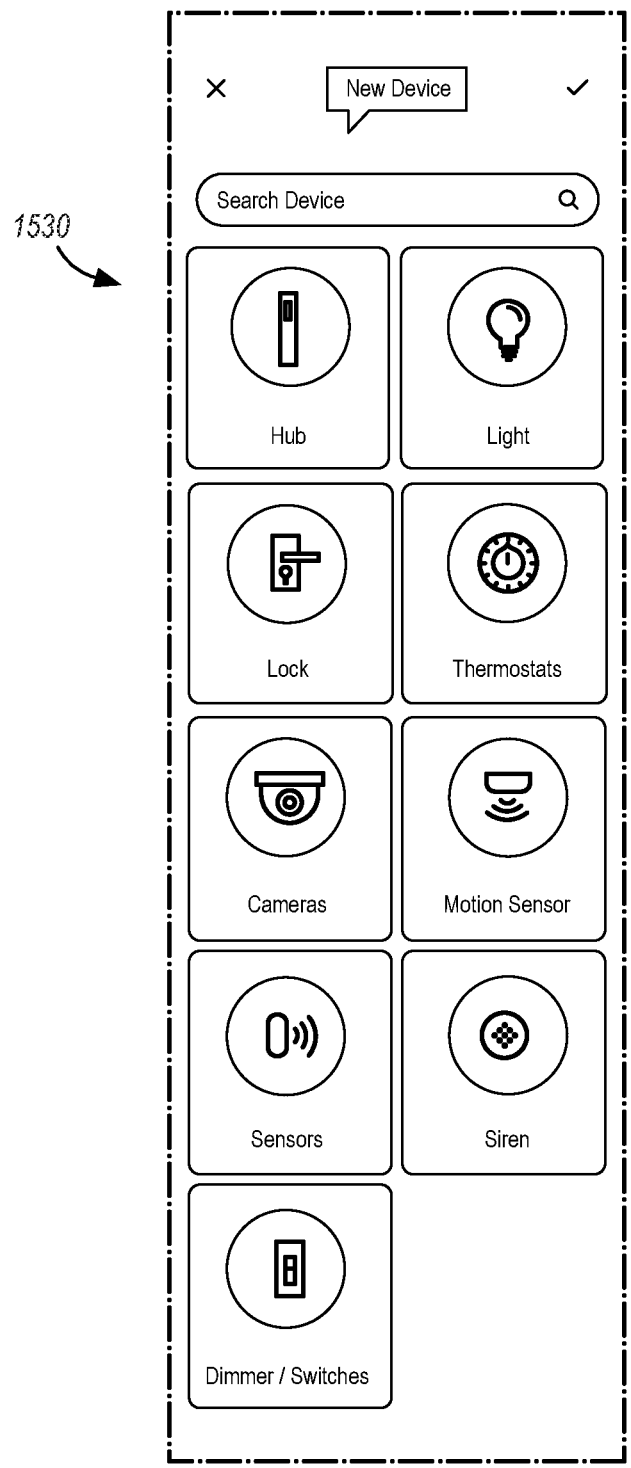

FIG. 15C depicts a user interface 1520 that shows the user can also view individual devices or groups of devices in detail, and access deeper controls for them. This is an example of a detail screen for controlling a cluster of lights in a Bedroom. You can control each light in the cluster and set overall brightness for the cluster. FIG. 15D depicts a user interface 1530 that shows users can also add new devices to their space. The user interface 1530 depicts a sample selection of devices a user can add to a space. A device can be any object that is controllable remotely via a network connection.

The examples described herein related to the personification of a building that contains multiple devices that can be controlled remotely, but any individual object may be treated in the same way. As such, any object or device in which a user would want to control or interact with remotely could be treated as a "contact". Any object that can be controlled remotely via a network connection can be added as a "contact". Other examples could include robotic companions such as a robot pet, robot helper, or robotic vehicle.

Further, disclosed embodiments may be integrated into a number of different spaces. Examples of spaces can also extend beyond homes, offices, or buildings. A space can also be a car. A car can contain multiple devices and sensors that a user would want to control remotely, such as unlocking the car or trunk doors, or monitoring security cameras mounted on or inside the car. Examples of spaces could include but are not limited to buildings, individual rooms, automobiles, boats, planes, other vehicles, any other structures or compartments with discernible boundaries.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below.

Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for dynamic syncing of content within a communication interface, comprising:
   one or more processors; and
   one or more computer-readable media having stored thereon executable instructions that when executed by the one or more processors configure the computer system to:
      receive an indication, from a first user at a first communication interface, to share digital content with a second user, wherein:
         the digital content is contained within a digital file, and
         the digital content comprises a video file or audio file embedded within a text document;
      transmit a copy of the digital file to the second user, wherein the digital content within the copy of the digital file is displayed or played to the second user within a second communication interface;
      receive a synchronization command from the first user, wherein the synchronization command comprises multiple layers of spatial mapping, the multiple layers of spatial mapping comprising:
         a first layer that comprises a scroll offset for the text document, and
         a second layer that comprises a video file identifier or audio file identifier and scrub position for the video file or the audio file; and
      in response to the synchronization command, cause the second communication interface to mirror a first user's view of the text document and the video file or audio file.

2. The computer system as recited in claim 1, further comprising executable instructions that when executed cause the computer system to:
   cause the digital content to be visually displayed to the second user through the second communication interface, wherein the second communication interface is configured to cause the digital content to respond to commands received from the second user.

3. The computer system as recited in claim 1, wherein the executable instructions for causing the second communication interface to mirror the first user's view of the digital content further comprise executable instructions that when executed cause the computer system to:
   convert the scroll offset to a normalized scroll offset based upon a predetermined page length of the digital content, wherein the scroll offset is tracked on a per-pixel basis of the first user's view;
   communicate the normalized scroll offset to the second user; and
   cause the second communication interface to move from a current view of the digital content to the normalized scroll offset.

4. The computer system as recited in claim 1, wherein the executable instructions for receiving a synchronization command from the first user further comprise executable instructions that when executed cause the computer system to:
   receive from the first user a zoom offset indicating the zoom offset of the first user's view of the digital content.

5. The computer system as recited in claim 1, wherein the executable instructions for receiving a synchronization command from the first user further comprise executable instructions that when executed cause the computer system to:
   receive from the first user a scrub position indicating a time stamp of the first user's view of the digital content.

6. The computer system as recited in claim 5, wherein the executable instructions for causing the second communication interface to mirror the first user's view of the digital content further comprise executable instructions that when executed cause the computer system to:
   communicate the scrub position to the second user; and
   cause the second communication interface to move from a current position of the digital content to the scrub position.

7. The computer system as recited in claim 1, wherein prior to receiving the synchronization command from the first user, the second user is allowed to interact with the digital content without constraint from the first user.

8. The computer system as recited in claim 1, wherein after receiving the synchronization command from the first user, the second user is only able to interact with a mirror of the first user's view of the digital content.

9. The computer system as recited in claim 1, wherein the digital content comprises an audio file.

10. A computer-implemented method, executed on one or more processors, for dynamic syncing of content within a communication interface, the computer-implemented method comprising:
    receiving an indication, from a first user at a first communication interface, to share digital content with a second user, wherein:
       the digital content is contained within a digital file, and
       the digital content comprises a video file or audio file embedded within a text document;
    transmitting a copy of the digital file to the second user, wherein the digital content within the copy of the digital file is displayed or played to the second user within a second communication interface;
    receiving a synchronization command from the first user, wherein the synchronization command comprises multiple layers of spatial mapping, the multiple layers of spatial mapping comprising:
       a first layer that comprises a scroll offset for the text document, and
       a second layer that comprises a video file identifier or audio file identifier and scrub position for the video file or the audio file; and
    in response to the synchronization command, causing the second communication interface to mirror a first user's view of the text document and the video file or audio file.

11. The computer-implemented method as recited in claim 10, further comprising:
    causing the digital content to be visually displayed to the second user through the second communication interface, wherein the second communication interface is configured to cause the digital content to respond to commands received from the second user.

12. The computer-implemented method as recited in claim 10, wherein causing the second communication interface to mirror the first user's view of the digital content further comprises:
    converting the scroll offset to a normalized scroll offset based upon a predetermined page length of the digital content, wherein the scroll offset is tracked on a per-pixel basis of the first user's view;

communicating the normalized scroll offset to the second user; and causing the second communication interface to move from a current view of the digital content to the normalized scroll offset.

13. The computer-implemented method as recited in claim 10, wherein receiving a synchronization command from the first user further comprises:

receiving from the first user a zoom offset indicating the zoom offset of the first user's view of the digital content.

14. The computer-implemented method as recited in claim 10, wherein receiving a synchronization command from the first user further comprises:

receiving from the first user a scrub position indicating a time stamp of the first user's view of the digital content.

15. The computer-implemented method as recited in claim 14, wherein causing the second communication interface to mirror the first user's view of the digital content further comprises:

communicating the scrub position to the second user; and causing the second communication interface to move from a current position of the digital content to the scrub position.

16. The computer-implemented method as recited in claim 10, wherein prior to receiving the synchronization command from the first user, the second user is allowed to interact with the digital content without constraint from the first user.

17. The computer-implemented method as recited in claim 10, wherein after receiving the synchronization command from the first user, the second user is only able to interact with a mirror of the first user's view of the digital content.

18. A computer-readable media comprising one or more non-transitory physical computer-readable storage media having stored thereon computer-executable instructions that, when executed at a processor, cause a computer system to perform a method for dynamic syncing of content within a communication interface, the method comprising:

receiving an indication, from a first user at a first communication interface, to share digital content with a second user, wherein:
the digital content is contained within a digital file, and
the digital content comprises a video file or audio file embedded within a text document;

transmitting a copy of the digital file to the second user, wherein the digital content within the copy of the digital file is displayed or played to the second user within a second communication interface;

receiving a synchronization command from the first user, wherein the synchronization command comprises multiple layers of spatial mapping, the multiple layers of spatial mapping comprising:
a first layer that comprises a scroll offset for the text document, and
a second layer that comprises a video file identifier or audio file identifier and scrub position for the video file or the audio file; and in response to the synchronization command, causing the second communication interface to mirror a first user's view of the text document and the video file or audio file.

* * * * *